(12) United States Patent
Janjua et al.

(10) Patent No.: US 10,882,029 B1
(45) Date of Patent: Jan. 5, 2021

(54) GRAPHENE OXIDE AND COBALT TIN OXIDE NANOCOMPOSITE AND METHOD OF USE

(71) Applicant: KING FAHD UNIVERSITY OF PETROLEUM AND MINERALS, Dhahran (SA)

(72) Inventors: Mohammad Ramzan Saeed Ashraf Janjua, Dhahran (SA); Saba Jamil, Faisalabad (PK); Hasnaat Ahmad, Faisalabad (PK); Shafiq Ur-Rehman, Faisalabad (PK); Shanza Rauf Khan, Faisalabad (PK)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/595,577

(22) Filed: Oct. 8, 2019

(51) Int. Cl.
*B01J 23/835* (2006.01)
*B01J 35/00* (2006.01)
(Continued)

(52) U.S. Cl.
CPC ............ *B01J 23/835* (2013.01); *B01J 21/18* (2013.01); *B01J 35/004* (2013.01); *B01J 35/0013* (2013.01); *B01J 35/0033* (2013.01); *C02F 1/32* (2013.01); *C02F 1/722* (2013.01); *C02F 1/725* (2013.01); *C10L 1/1233* (2013.01);
(Continued)

(58) Field of Classification Search
CPC .... B01J 23/835; B01J 35/004; B01J 35/0013; B01J 35/0033; B01J 21/18; C10L 10/00; C10L 1/1233; C10L 2200/043; C10L 2270/04; C10L 2290/141; C10L 2230/22; C10L 2200/0254; C10L 2230/04; C10L 2250/06; C02F 1/725; C02F 1/722; C02F 1/32; C02F 2101/308; C02F 2305/10; C02F 2305/08

See application file for complete search history.

(56) References Cited

U.S. PATENT DOCUMENTS 10,131,852 B1 * 11/2018 Khaled .................. C10G 25/09
2014/0054490 A1    2/2014 Sundara et al.
2017/0369333 A1 * 12/2017 Heidarizad ............ B01J 20/205

FOREIGN PATENT DOCUMENTS

CN           103107313 B    12/2014
CN           107799748 A     3/2018
(Continued)

OTHER PUBLICATIONS

Jian Huang, et al., "3D Graphene Encapsulated Hollow CoSnO₃ Nanoboxes as a High Initial Coulombic Efficiency and Lithium Storage Capacity Anode", Small, vol. 14, Issue 10, Dec. 27, 2017, 4 pages (Abstract only).

(Continued)

*Primary Examiner* — Cephia D Toomer
(74) *Attorney, Agent, or Firm* — Oblon, McClelland, Maier & Neustadt, L.L.P.

(57) ABSTRACT

A method for using a nanocomposite of tin cobalt oxide nanocubes and graphene oxide to photo-catalytically degrade a portion of an organic contaminant in a solution. The nanocubes have an average side length in a range of 400 nm-1.5 μm and a carbon to tin molar ratio in a range of 10:1-25:1. The nanocomposite may also be used for enhancing the efficiency of a liquid fuel.

20 Claims, 33 Drawing Sheets

(51) Int. Cl.
*C10L 10/00* (2006.01)
*C10L 1/12* (2006.01)
*C02F 1/72* (2006.01)
*C02F 1/32* (2006.01)
*B01J 21/18* (2006.01)
*C02F 101/30* (2006.01)

(52) U.S. Cl.
CPC ........ *C10L 10/00* (2013.01); *C02F 2101/308* (2013.01); *C02F 2305/08* (2013.01); *C02F 2305/10* (2013.01); *C10L 2200/0254* (2013.01); *C10L 2200/043* (2013.01); *C10L 2230/04* (2013.01); *C10L 2230/22* (2013.01); *C10L 2250/06* (2013.01); *C10L 2270/04* (2013.01); *C10L 2290/141* (2013.01)

(56) References Cited

FOREIGN PATENT DOCUMENTS

| | | |
|---|---|---|
| CN | 108817413 A | 11/2018 |
| CN | 109437329 A | 3/2019 |

OTHER PUBLICATIONS

Kolsoum Pourzare, et al., "Graphene Oxide/$Co_3O_4$ Nanocomposite: Synthesis, Characterization, and Its Adsorption Capacity for the Removal of Organic Dye Pollutants from Water", Acta Chim. Slov. vol. 64, 2017, pp. 945-958.

Penghui Shi, et al., "Synergistic catalysis of $Co_3O_4$ and graphene oxide on $Co_3O_4$/GO catalysts for degradation of Orange II in water by advanced oxidation technology based on sulfate radicals", Chemical Engineering Journal, vol. 240, Mar. 15, 2014, pp. 264-270 (Abstract only).

Siying Wen, et al., "Facile synthesis of $MSnO_3$ (M=Mn, Co, Zn)/reduced graphene oxide nanocomposites as anode materials for sodium-ion batteries", Journal of Alloys and Compounds, vol. 784, May 5, 2019, pp. 88-95 (Abstract only).

Shuming Dou, et al., "Novel amorphous CoSnO3@rGO nanocomposites highly enhancing sodium storage", Electrochimica Acta, vol. 316, 2019, pp. 236-247.

Maryam Masjedi-Arani, et al., "Ultrasonic assisted synthesis of a nano-sized $Co_2SnO_4$/graphene: A potential material for electrochemical hydrogen storage application", International Journal of Hydrogen Energy, vol. 43, Issue 9, Mar. 1, 2018, pp. 4381-4392 (Abstract only).

Saba Jamil, et al., "The first morphologically controlled synthesis of a nanocomposite of graphene oxide with cobalt tin oxide nanoparticles", RSC Advances, vol. 8, 2018, pp. 36647-36661.

Saba Jamil, et al., "First Synthetic Study of Cube-Like Cobalt Hydroxystannate Nanoparticles as Photocatalyst for Drimarene Red K-4BL Degradation and Fuel Additive", Journal of Cluster Science, 2018, 12 pages.

\* cited by examiner

GRAPHENE OXIDE AND COBALT TIN OXIDE NANOCOMPOSITE AND METHOD OF USE

STATEMENT REGARDING PRIOR DISCLOSURES BY THE INVENTORS

Aspects of this technology are described in an article "The first morphologically controlled synthesis of a nanocomposite of graphene oxide with cobalt tin oxide nanoparticles" by Saba Jamil, Hasnaat Ahmad, Shafiq-ur-Rehman, Shanza Rauf Khan, and Muhammad Ramzan Saeed AshrafJanjua, in RSC Advances, 2018, 8, 36647, DOI: 10.1039/c8ra05962d, which is incorporated herein by reference in its entirety.

BACKGROUND OF THE INVENTION

Technical Field

The present invention relates to a method of using a nanocomposite of graphene oxide with cobalt tin oxide for water purification and for increasing fuel efficiency.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Nanotechnology has secured a significant role in different fields because of its use in electronics, medicines, storage devices, biomedical applications, catalysis and drug delivery in recent years. See A. R. Babar, et al., Electrical and dielectric properties of co-precipitated nanocrystalline tin oxide, J. Alloys Compd., 2010, 505(2), 743-749; M. U. Niemann, et al., Processing analysis of the ternary $LiNH_2$—$MgH_2$—$LiBH_4$ system for hydrogen storage, Int. J. Hydrogen Energy, 2009, 34(19), 8086-8093; A. Chen and S. Chatterjee, Nanomaterials based electrochemical sensors for biomedical applications, Chem. Soc. Rev., 2013, 42(12), 5425-5438; S. Jamil, et al., Synthesis, characterization and catalytic application of polyhedron zinc oxide microparticles, Mater. Res. Express, 2017, 4(1), 015902; and M. Mahmoudi, et al., Superparamagnetic iron oxide nanoparticles (SPIONs): development, surface modification and applications in chemotherapy, Adv. Drug Delivery Rev., 2011, 63(1-2), 24-46. Currently, the focus of nanotechnology is increasing significantly towards the synthesis of nanocomposites because of their unique fundamental physical and chemical properties, and potential applications in different domains. See S. Jamil, M. R. S. A. Janjua and T. Ahmad, The synthesis of flower shaped microstructures of $Co_3O_4$ by solvothermal approach and investigation of its catalytic activity, Solid State Sci., 2014, 36, 73-79.

Bisphenol A (BPA) is known as a dangerous environmental pollutant, and it is mostly used as a raw material in industries that synthesize polycarbonate and epoxy resins. $TiO_2$, Zn, Bi, Ag, and carbon based photocatalysts and their derivatives have been used for the degradation of (BPA) in contaminated industrial wastewater. See P. V. L. Reddy, et al., Photocatalytic degradation of bisphenol A in aqueous media: a review, J. Environ. Manage., 2018, 213, 189-205. The controlled morphological synthesis of single metal oxides at the nano and micro level by using a hydrothermal bottom-up approach has become a promising method of synthesis. See R. Mariappan and S. Mahalingam, [Bmim][TfO] ionic liquid-assisted oriented growth of $Co_3O_4$ nanoworms, Mater. Res. Bull., 2013, 48(2), 618-623. The many physical and chemical properties of metal oxide nanoparticles depend on the aspect ratio, crystalline density and stacking number. See S. Farhadi, K. Pourzare, and S. Sadeghinejad, Simple preparation of ferromagnetic $Co_3O_4$ nanoparticles by thermal dissociation of the [Co II $(NH_3)_6$] $(NO_3)_2$ complex at low temperature, J. Nanostruct. Chem., 2013, 3(1), 16. Simple $SnO_2$ nanoparticles have been widely used as electrocatalysts, photocatalysts, and fuel additives. See L. Jiang, et al., Size-controllable synthesis of monodispersed $SnO_2$ nanoparticles and application in electrocatalysts, J. Phys. Chem. B, 2005, 109(18), 8774-8778; P. V. Viet, et al., Fusarium antifungal activities of copper nanoparticles synthesized by a chemical reduction method, J. Nanomater., 2016, 2016, 6; and M. U. Khalid, S. R. Khan and S. Jamil, Morphologically Controlled Synthesis of Cubes like Tin Oxide Nanoparticles and Study of its Application as Photocatalyst for Congo Red Degradation and as Fuel Additive, J. Inorg. Organomet. Polym. Mater., 2018, 28(1), 168-176. Similarly, cobalt oxide nanoparticles have been used in the electrochemical detection of hydrogen peroxide, gas sensing, and aerobic oxidation of alcohol in the liquid phase. See A. Salimi, et al., Nanomolar detection of hydrogen peroxide on glassy carbon electrode modified with electrodeposited cobalt oxide nanoparticles, Anal. Chim. Acta, 2007, 594(1), 24-31; S. Jamil, et al., The synthesis of porous $Co_3O_4$ micro cuboid structures by solvothermal approach and investigation of its gas sensing properties and catalytic activity, Mater. Res. Bull., 2013, 48(11), 4513-4520; J. Zhu, et al., Supported cobalt oxide nanoparticles as catalyst for aerobic oxidation of alcohols in liquid phase, ACS Catal., 2011, 1(4), 342-347. On the basis of these unique properties and the applications of these two metals, many researchers have attempted to achieve a good controlled morphology of CoSn oxide or hydroxide nanoparticles by different methods i.e., by electrostatic spray deposition (ESD), a wet sonochemical method, and a hydrothermal approach. See X. J. Zhu, et al., Highly porous reticular tin-cobalt oxide composite thin film anodes for lithium ion batteries, J. Mater. Chem., 2009, 19(44), 8360-8365; H. Jena, K. G. Kutty and T. Kutty, Ionic transport and structural investigations on $MSn(OH)_6$ (M=Ba, Ca, Mg, Co, Zn, Fe, Mn) hydroxide perovskites synthesized by wet sonochemical methods, Mater. Chem. Phys., 2004, 88(1), 167-179; and D. Huang, et al., Hydrothermal synthesis of $MSn(OH)_6$ (M=Co, Cu, Fe, Mg, Mn, Zn) and their photocatalytic activity for the destruction of gaseous benzene, Chem. Eng. J., 2015, 269, 168-179. A catalyst with nonporous oxygen evolution was prepared by selective electrochemical etching of cobalt hydroxystannate nanoparticles and applied in the oxygen evolution reaction (OER) because of its unique properties of high surface area and high compatibility, when $CoSn(OH)_6$ nanoparticles were calcined at 400° C., they changed into cobalt tin oxide. See F. Huang, et al., A novel tin-based nanocomposite oxide as negative-electrode materials for Li-ion batteries, Mater. Lett., 2003, 57(22-23), 3341-3345; F. Song, K. Schenk and X. Hu, A nanoporous oxygen evolution catalyst synthesized by selective electrochemical etching of perovskite hydroxide CoSn $(OH)_6$ nanocubes, Energy Environ. Sci., 2016, 9(2), 473-477; and C. Y. Teh, T. Y. Wu and J. C. Juan, An application of ultrasound technology in synthesis of titania-based photocatalyst for degrading pollutant, Chem. Eng. J., 2017, 317, 586-612.

Chemically synthesized graphene oxide (GO) is an atomically fine sheet of graphite powder that can be used as a precursor for graphene sheets with its own properties. See K. P. Loh, et al., Graphene oxide as a chemically tunable platform for optical applications, *Nat. Chem.*, 2010, 2(12), 1015. GO has excellent properties that make it an interesting material in advanced future applications in the fields of electronics and photonics, solar cells, and wireless humidity sensing. See P. Avouris and F. Xia, Graphene applications in electronics and photonics, *MRS Bull.*, 2012, 37(12), 1225-1234; L. Lancellotti, et al., Graphene applications in Schottky barrier solar cells, *Thin Solid Films*, 2012, 522, 390-394; and X. Huang, et al., Graphene oxide dielectric permittivity at GHz and its applications for wireless humidity sensing, *Sci. Rep.*, 2018, 8(1), 43. In addition, many dyes are visible in water at concentrations as low as 1 ppm, which is enough to present an aesthetic problem. See W. Subramonian and T. Y. Wu, Effect of enhancers and inhibitors on photocatalytic sunlight treatment of methylene blue, *Water, Air, Soil Pollut.*, 2014, 225(4), 1922. Many research papers are also available in the scientific literature in which bimetallic nanoparticles have been prepared by different methods, and their different applications have been reported. See S. Li, et al., Facile synthesis of bimetallic Ag—Cu nanoparticles for colorimetric detection of mercury ion and catalysis, *Sens. Actuators, B*, 2018, 255, 1471-1481; P. Cheng, et al., Fast sonochemical synthesis of $CoSn(OH)_6$ nanocubes, conversion towards shape-preserved $SnO_2$—$Co_3O_4$ hybrids and their photodegradation properties, *Mater. Lett.*, 2013, 90, 19-22; A. Vazquez-Olmos, et al., Mechanochemical Synthesis of $YFeO_3$ Nanoparticles: Optical and Electrical Properties of Thin Films, *J. Cluster Sci.*, 2018, 29(2), 225-233; G. Sun, et al., Solvothermal synthesis and characterization of porous zinc hydroxystannate microspheres, *Mater. Lett.*, 2015, 150, 105-107; F. C. F. Low, et al., Investigation into photocatalytic decolorisation of CI Reactive Black 5 using titanium dioxide nanopowder, *Color. Technol.*, 2012, 128(1), 44-50; Z. Wang, et al., Amorphous $CoSnO_3@C$ nanoboxes with superior lithium storage capability, *Energy Environ. Sci.*, 2013, 6(1), 87-91; and J. Zhang, et al., Synthesis of $Co_2SnO_4$ hollow cubes encapsulated in graphene as high capacity anode materials for lithium-ion batteries, *J. Mater. Chem. A*, 2014, 2(8), 2728-2734. Many scientists have reported graphene based composites with oxides such as $BiFeO_3$, composites with RGO, $CeO_2$/graphene nanocomposites, and $TiO_2$ composites with graphene nanosheets but a composite of tin cobalt oxide nanoparticles with graphene oxide used for RB 5 dye degradation and as a fuel additive has not been reported, although some scientists have reported this composite with different applications. See Y.-h. Si, et al., Enhanced Visible Light Driven Photocatalytic Behavior of $BiFeO_3$/Reduced Graphene Oxide Composites, *Nanomaterials*, 2018, 8(7), 526; L. Jiang, et al., Controlled synthesis of $CeO_2$/graphene nanocomposites with highly enhanced optical and catalytic properties, *J. Phys. Chem. C*, 2012, 116(21), 11741-11745; Wang et al (2013); Zhang et al. (2014); J.-W. Shi, et al., The composite of nitrogen-doped anatase titania plates with exposed {0 0 1} facets/graphene nanosheets for enhanced visible-light photocatalytic activity, *J. Colloid Interface Sci.*, 2014, 430, 100-107; Wang et al (2013); Zhang et al. (2014); Y. Cao, et al., Facile synthesis of $CoSnO_3$/Graphene nanohybrid with superior lithium storage capability, *Electrochim. Acta*, 2014, 132, 483-489; M. Ismail, et al., Green synthesis of plant supported Cu Ag and Cu Ni bimetallic nanoparticles in the reduction of nitrophenols and organic dyes for water treatment, *J. Mol. Liq.*, 2018, 260, 78-91; J. Wang, et al., Iron-copper bimetallic nanoparticles supported on hollow mesoporous silica spheres: an effective heterogeneous fenton catalyst for orange 11 degradation, *RSC Adv.*, 2015, 5(85), 69593-69605; N. Qin, et al., Enhanced removal of trace Cr (VI) from neutral and alkaline aqueous solution by FeCo bimetallic nanoparticles, *J. Colloid Interface Sci.*, 2016, 472, 8-15; Z. Guo, et al., Construction of cost-effective bimetallic nanoparticles on titanium carbides as a superb catalyst for promoting hydrolysis of ammonia borane, *RSC Adv.*, 2018, 8(2), 843-847; N. Arora, et al., 4-Nitrophenol reduction catalysed by Au—Ag bimetallic nanoparticles supported on LDH: homogeneous vs. heterogeneous catalysis, *Appl. Clay Sci.*, 2018, 151, 1-9; and M. Khan, et al., Graphene based metal and metal oxide nanocomposites: synthesis, properties and their applications, *J. Mater. Chem. A*, 2015, 3(37), 18753-18808.

Azo reactive dyes that contain one to four azo groups in their chemical structure represent one main group of textile dyes, usually attached with two radicals, exceptionally one, but usually both, are aromatic groups. These dyes are chemically stable and difficult to degrade. See D. Mantzavinos and E. Psillakis, Enhancement of biodegradability of industrial wastewaters by chemical oxidation pre-treatment, *J. Chem. Technol. Biotechnol.*, 2004, 79(5), 431-454. The RB 5 dye was removed by the Fenton's oxidation (FO) process using a significant amount of $FeSO_4$ and hydrogen peroxide. See S. Meriç, D. Kaptan and T. Ölmez, Color and COD removal from wastewater containing Reactive Black 5 using Fenton's oxidation process, *Chemosphere*, 2004, 54(3), 435-441. This dye was also investigated in a heterogeneous aqueous solution which contains semiconductor oxides i.e., $CO_2$, $NO_3^-$, and $SO_4^{2-}$ ions, as photocatalysts. See I. Poulios and I. Tsachpinis, Photodegradation of the textile dye Reactive Black 5 in the presence of semiconducting oxides, *J. Chem. Technol. Biotechnol.*, 1999, 74(4), 349-357. A UV reactor with $TiO_2$ was used to break down the color of RB 5 as an annular photoreactor. See C. Tang and V. Chen, The photocatalytic degradation of reactive black 5 using $TiO_2$/UV in an annular photoreactor, *Water Res.*, 2004, 38(11), 2775-2781. Doped $TiO_2$ in the presence of N and F increases the intrinsic properties of the catalyst and shows an increased kinetic UV photoreactivity as compared to the un-doped $TiO_2$ in the degradation of 1,3,5-triazine herbicides. See E. M. Samsudin, et al., Enhancement of the intrinsic photocatalytic activity of $TiO_2$ in the degradation of 1,3,5-triazine herbicides by doping with N, F, *Chem. Eng. J.*, 2015, 280, 330-343. Cao et al. reported the synthesis of a graphene-$TiO_2$ composite and its application for tetrabromobisphenol A degradation. See M. Cao, et al., Photocatalytic degradation of tetrabromobisphenol A by a magnetically separable graphene-$TiO_2$ composite photocatalyst: Mechanism and intermediates analysis, *Chem. Eng. J.*, 2015, 264, 113-124. Karthik et al. used a graphene-cerium molybdate composite for the photocatalytic degradation of the antibiotic chloramphenicol. See R. Karthik, et al., A study of electrocatalytic and photocatalytic activity of cerium molybdate nanocubes decorated graphene oxide for the sensing and degradation of antibiotic drug chloramphenicol, *ACS Appl. Mater. Interfaces*, 2017, 9(7), 6547-6559. Al-Nafiey et al. used a graphene-cobalt oxide composite for the removal of three organic dyes (rhodamine B, methyl orange, and rose bengal). See A. Al Nafiey, et al., Reduced graphene oxide decorated with $Co_3O_4$ nanoparticles (rGO-$Co_3O_4$) nanocomposite: a reusable catalyst for highly efficient reduction of 4-nitrophenol, and Cr(VI) and dye removal from aqueous solutions, *Chem. Eng. J.*, 2017, 322, 375-384.

The discharge of industrial wastewater containing dye pollutants presents acute or long term toxicity on ecosystems. See Mantzavinos et al. (2004); and S. B. Jadhav and R. S. Singhal, Polysaccharide conjugated laccase for the dye decolorization and reusability of effluent in textile industry, *Int. Biodeterior. Biodegrad.*, 2013, 85, 271-277, each incorporated herein by reference in its entirety. It is estimated that annually 80,000 tons of more than ten thousand various kinds of dyes are synthesized worldwide and approximately 5.0-10.0% are discharged into wastewater. See C. Hessel, et al., Guidelines and legislation for dye house effluents, *J. Environ. Manage.*, 2007, 83(2), 171-180. 10-15% of all reactive industrial dyestuffs are excreted directly into wastewater due to inefficiency in dyeing operations. See C. Pratum, et al., *Decolorization of reactive dyes and textile dyeing effluent by Pleurotus sajor-caju*, 2012. Thus, the removal of reactive dyes is a serious challenge. See M. C. Silva, et al., Decolorization of the phthalocyanine dye reactive blue 21 by turnip peroxidase and assessment of its oxidation products, *J. Mol. Catal. B: Enzym.*, 2012, 77, 9-14.

In view of difficulty in removing dyes from water, one objective of the present invention is to provide a method for reducing a contaminant concentration such as RB 5 azo dye using a nanocomposite of graphene oxide with cobalt tin oxide. In addition, a method for using the nanocomposite to increase fuel efficiency is also provided.

BRIEF SUMMARY OF THE INVENTION

According to a first aspect, the present disclosure relates to a method of reducing an organic contaminant concentration in a solution. The solution has an organic contaminant concentration of 5-200 ppm. The method involves mixing the solution with a nanocomposite and hydrogen peroxide to form a mixture. The nanocomposite comprises tin cobalt oxide nanocubes and graphene oxide. The mixture is irradiated to photo-catalytically degrade a portion of the organic contaminant.

In one embodiment, the nanocomposite has a cobalt to tin molar ratio in a range of 2:1-4:1.

In one embodiment, the nanocubes have an average side length in a range of 400 nm-1.5 µm.

In one embodiment, the nanocomposite has a carbon to tin molar ratio in a range of 10:1-25:1.

In one embodiment, the nanocomposite has an empirical formula of $C_{16}Co_4O_{16}Sn$.

In one embodiment, the nanocomposite consists essentially of carbon, cobalt, oxygen, and tin.

In one embodiment, the nanocomposite has a band gap in a range of 2.92-3.02 eV.

In one embodiment, the irradiating involves exposing the mixture to sunlight for a time in a range of 120-200 min.

In one embodiment, a concentration of the nanocomposite in the mixture is in a range of 0.3-1.0 g/L.

In one embodiment, a concentration of the hydrogen peroxide in the mixture is in a range of 0.05-1 M.

In one embodiment, at least 75% of the organic contaminant is degraded, relative to an amount of organic contaminant before the irradiating.

In one embodiment, the organic contaminant has a UV-Vis absorption maximum in a range of 560-640 nm.

In one embodiment, the organic contaminant is a dye.

According to a second aspect, the present disclosure relates to a method of enhancing the efficiency of a liquid fuel. The method involves mixing a nanocomposite with the liquid fuel to produce an enhanced liquid fuel having a calorific value that is greater than the calorific value of the liquid fuel. The nanocomposite is present at a concentration in a range of 15-120 ppm, and the nanocomposite comprises tin cobalt oxide nanocubes and graphene oxide. The nanocubes have a cobalt to tin molar ratio in a range of 2:1-4:1.

In one embodiment, the nanocomposite has the empirical formula $C_{16}Co_4O_{16}Sn$.

In one embodiment, the liquid fuel is kerosene.

In one embodiment, a calorific value of the enhanced liquid fuel is between 20 and 40 times the calorific value of the liquid fuel.

In one embodiment, the liquid fuel and the enhanced liquid fuel have specific gravities having a percent difference of 0.7% or less.

In one embodiment, the enhanced liquid fuel has a specific gravity in a range of 0.7800-0.7900 $g/cm^3$.

In one embodiment, the enhanced liquid fuel has a flash point of 35° C. or lower.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
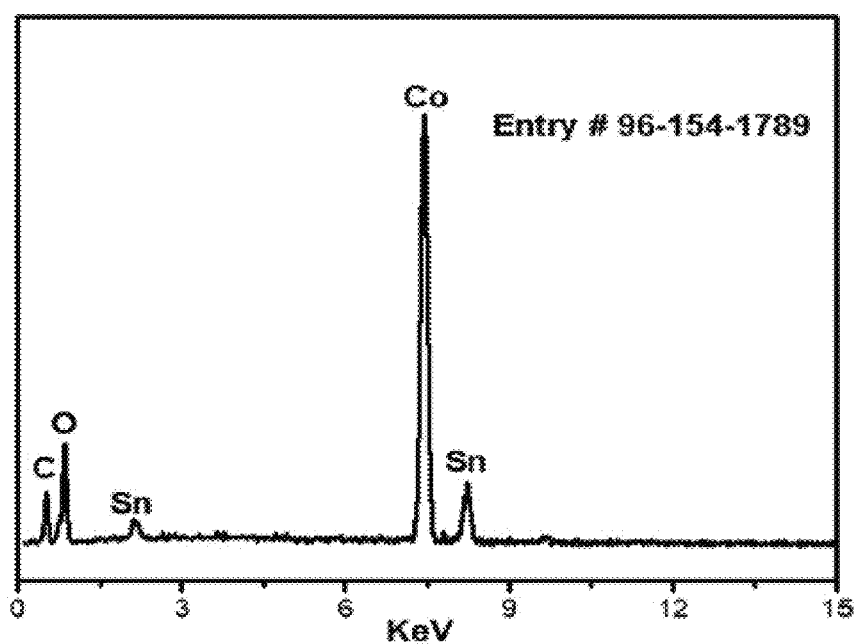
FIG. 1 is an EDX pattern of the $C_{16}Co_4O_{16}Sn$ nanocomposite.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $CoCl_2$ includes anhydrous $CoCl_2$, $CoCl_2.6H_2O$, and any other hydrated forms or mixtures. $SnCl_4$ includes both anhydrous $SnCl_4$ and $SnCl_4.5H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of cobalt include $^{112}Sn$, $^{114}Sn$, $^{115}Sn$, $^{116}Sn$, $^{117}Sn$, $^{118}Sn$, $^{119}Sn$, $^{120}Sn$, $^{122}Sn$, $^{124}Sn$, and $^{126}Sn$. Isotopes of cobalt include $^{56}Co$, $^{57}Co$, $^{58}Co$, $^{59}Co$, and $^{60}Co$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method of reducing an organic contaminant concentration in a solution, preferably an aqueous solution. The solution has an organic contaminant concentration in a range of 5-200 ppm, preferably 10-180 ppm, more preferably 15-150 ppm, even more preferably 20-100 ppm, even more preferably 25-50 ppm, or about 30 ppm.

The organic contaminant may be an herbicide, a fungicide, a pesticide, a pharmaceutical compound, a steroid, a microbial toxin, a metabolite, a disinfection byproduct, an arsenic-containing compound, a food byproduct, a dye, or some other organic molecule.

In one embodiment, the organic contaminant has a UV-Vis absorption maximum in a range of 560-640 nm, preferably 570-630 nm, more preferably 580-620 nm, even more preferably 590-610 nm, or about 598 nm.

Where the organic pollutant is a dye, the dye may be an azin dye, an azo dye, a diarylmethane dye, a fluorescent dye, a food coloring, a fuel dye, an ikat dye, an indigo structured dye, an indophenol dye, a perylene dye, a phenol dye, a quinoline dye, a rhodamine dye, a solvent dye, a staining dye, a thiazine dye, a thiazole dye, a triarylmethane dye, a vat dye, a violanthrone dye, or some other type of dye.

In a preferred embodiment, the dye may be an azo dye. Examples of azo dyes include, but are not limited to, Reactive Black 5 (RB5), Azo violet, Brown FK, Ponceau S, Sudan Black B, Mordant Red 19, and Trypan Blue. In a further embodiment, the dye is the azo dye Reactive Black 5 (RB5).

In one embodiment, the solution may be a contaminated water mixture. The contaminated water mixture may come from an ocean, a bay, a river, a lake, a swamp, a pond, a pool, a fountain, a bath, an aquarium, a water treatment plant, a sewage treatment plant, a desalination plant, petroleum extraction or processing, a manufacturing plant, a chemical plant, a textile plant, a power plant, a gas station, a food processing plant, a restaurant, a dry cleaners, or some other place that may generate contaminated water mixtures. In other embodiments, the contaminated water mixture may be in an emulsion with a non-polar liquid phase.

The method involves mixing the solution with a nanocomposite and hydrogen peroxide to form a mixture. In some embodiments, the solution may or may not be pre-processed before the mixing, for instance, by filtering through a coarse filter to remove large particulate matter, or by exposure to UV light or ozone.

In one embodiment, a concentration of the nanocomposite in the mixture is in a range of 0.3-1.0 g/L, preferably 0.4-0.9 g/L, more preferably 0.5-0.8 g/L, or about 0.7 g/L.

In one embodiment, a concentration of the hydrogen peroxide in the mixture is in a range of 0.05-1 M, preferably 0.1-0.9 M, more preferably 0.2-0.8 M, even more preferably 0.3-0.7 M.

The nanocomposite comprises tin cobalt oxide nanocubes and graphene oxide. In one embodiment, the nanocubes have an average side length in a range of 400 nm-1.5 µm, preferably 450 nm-1.4 µm, more preferably 500 nm-1.3 µm, even more preferably 550 nm-1.2 µm, or 600 nm-1.1 µm, or 650 nm-1.0 µm, or 700 nm-1.0 µm, or 750 nm-1 In one embodiment, the tin cobalt oxide nanocubes may have a monodisperse side length, having a coefficient of variation or relative standard deviation, expressed as a percentage and defined as the ratio of the side length standard deviation ($\sigma$) to the side length mean ($\mu$), multiplied by 100%, of less than 25%, preferably less than 10%, preferably less than 8%, preferably less than 6%, preferably less than 5%. In a preferred embodiment, the tin cobalt oxide nanocubes are monodisperse having a side length distribution ranging from 80% of the average side length to 120% of the average side length, preferably 85-115%, preferably 90-110% of the average side length. In another embodiment, the tin cobalt oxide nanocubes are not monodisperse.

In one embodiment, each nanocube may have adjacent edges that form substantially perpendicular angles, where the substantially perpendicular angles formed in each nanocube deviate by less than 20°, preferably less than 15°, more preferably less than 10°, even more preferably less than 5° from an exact perpendicular angle of 90°. In one embodiment, the nanocubes may have rectangular or square faces, each having an aspect ratio in a range of 1.2:1-1:1, preferably 1.1:1-1:1, even more preferably 1.05:1-1:1, or about 1:1.

In alternative embodiments, the tin cobalt oxide may be in the form of nanoparticles that are not nanocubes, for instance, the tin cobalt oxide may have a spherical shape, or may be shaped like cylinders, elongated boxes, spikes, flakes, plates, ellipsoids, toroids, stars, ribbons, discs, rods, granules, prisms, cones, flakes, platelets, sheets, or some other shape.

Preferably the graphene oxide is in the form of sheets. The sheets may have lengths or widths in a range of 500 nm-15 µm, preferably 1 µm-12 µm, more preferably 2 µm-10 µm. In one embodiment, the graphene oxide may be a reduced graphene oxide (r-GO).

Graphene is an allotrope of carbon in the form of a two-dimensional, atomic-scale hexagonal lattice in which one atom forms each vertex. Graphene is approximately 200 times stronger than steel by weight and conducts heat and electricity with great efficiency. It is the basic structural element of other allotropes including graphite, charcoal, carbon nanotubes, and fullerenes. Carbon nanotubes are formed by rolling up a graphene sheet into a tubular structure, and graphite is formed by stacking multiple graphene sheets. Graphene or other allotropes of carbon may be synthesized and formed into a variety of morphologies and shapes including, but not limited to, nanoparticles, nanosheets, nanoplatelets, nanocrystals, nanospheres, nanowires, nanofibers, nanoribbons, nanorods, nanotubes, nanocylinders, nanogranules, nanowhiskers, nanoflakes, nanofoils, nanopowders, nanoboxes, nanostars, tetrapods, nanobelts, nanoflowers, etc. and mixtures thereof.

Structurally, graphene is a crystalline allotrope of carbon with 2-dimensional properties. As used herein, graphene is a sheet of six-membered carbon rings that do not form a closed surface. Its carbon atoms are densely packed in a regular atomic-scale "chicken wire" (hexagonal) pattern. Each atom has four bonds, one σ-bond with each of its three neighbors, and one 7t-bond that is oriented out of the plane. Graphene's hexagonal lattice can be regarded as two interleaving triangular lattices.

Graphene's stability is due to its tightly packed carbon atoms and each carbon atom in a graphene sheet having an $sp^2$ orbital hybridization with delocalized electrons present at opposite surfaces of the graphene sheet. The $sp^2$ hybridization is a combination of orbitals S, $P_x$, and $P_y$ that constitute the σ-bond, and the final $P_z$ electron makes up the π-bond. The π-bonds hybridize together to form the π-band and the π*-band. These bands are responsible for most of graphene's notable electronic properties, via the half-filled band that permits free-moving electrons. Graphene is a zero-gap semiconductor. Graphene is also the only form of carbon in which every atom is available for chemical reaction from two sides due to the 2D structure.

Graphene oxide (GO) is an electrically insulating material composed of a single graphene sheet with oxygen functional groups bonded perpendicularly to the graphene basal-plane See Lerf et al., "Structure of graphite oxide revisited" *J. Chem. B*, 102, 4477 (1998)—incorporated herein by reference in its entirety. Due to oxygen functional groups such as carboxyls, epoxides, and alcohols, GO is hydrophilic and can readily exfoliate as single sheets when ultrasonicated in $H_2O$. See Stankovich et al., "Synthesis of graphene-based nanosheets via chemical reduction of exfoliated graphite oxide" *Carbon*, 45, 1558 (2007)—incorporated herein by reference in its entirety. The average size of an individual GO sheet after oxidation and suspension in $H_2O$ may be 1 µm$^2$ or less, with a thickness of approximately 1 to 1.5 nm.

Graphene oxide may be reduced back to graphene by the removal of the oxygen function groups and recovery of the aromatic double-bonded carbon structure. Chemical reduction using hydrazine hydrate demonstrates that the conductivity of GO flakes can be increased by four- to five-orders of magnitude. See Gilje et al., "A Chemical Route to Graphene for Device Applications" Nano Lett., 7, 3394 (2007)—incorporated herein by reference. In addition, the mobility of reduced flakes exhibit field effect mobilities between 2 to 200 cm$^2$/V·s. See Gomez-Navarro et al., "Electronic Transport Properties of Individually Chemically Reduced Graphene Oxide Sheets" Nano Lett., 7, 3499 (2007)—incorporated herein by reference in its entirety. The reduction of graphene oxide may not always be complete, however, and the product, reduced graphene oxide (r-GO), may retain a certain number of oxidized carbons that retain oxygen or oxygen functional groups. Thus, in a strict sense, r-GO may not be atomically similar to pure graphene, though for applications, the two may be considered functionally equivalent.

In one embodiment, the r-GO of the present invention may comprise less than 15 mol % carbon, preferably less than 5 mol % carbon, more preferably less than 3 mol % carbon involved in a structural or chemical defect, including, but not limited to isotopic impurities, substitutional impurities, vacancies, and interstitial impurities.

In one embodiment, the r-GO of the present disclosure has an oxygen content of less than 5 wt %, preferably less than 4 wt %, preferably less than 3 wt %, preferably less than 2 wt %, preferably less than 1 wt % relative to a total weight of the r-GO. In one embodiment, the r-GO of the present disclosure has a C/O ratio of at least 10, preferably at least 20, preferably at least 30, preferably at least 40, preferably at least 50, preferably at least 75, preferably at least 100, preferably at least 150, preferably at least 200. In one embodiment, the r-GO may have a C/O ratio of less than 10, preferably less than 5, preferably less than 4, preferably less than 3, preferably less than 2.

In one embodiment, the r-GO of the present disclosure may be chemically modified; graphene is commonly modified with nitrogen and oxygen containing functional groups. For instance, the r-GO may be formed from graphene oxide that is only partially reduced. Exposed carbon on the edges of nanosheets or nanoplatelets often reacts with the atmosphere to form hydroxyls, carboxyls, lactones, pyrones, alcohols, carbonyls, imines, and/or amines. These modifications may be covalent, non-covalent, or mixtures thereof. Examples of functional groups on r-GO include, but are not limited to, alcoholic, carboxylic, aldehydic, ketonic, and esteric oxygenated functional groups. Alternatively, the r-GO may be chemically modified with amine or imine functionality. Chemical functionalization of the r-GO may aid the adsorption/absorption of different liquids, or improve the interface between the r-GO and the nanocubes.

In one embodiment, the r-GO of the present disclosure is in the form of nanoplatelets that have a thickness of 40-110 nm, preferably 45-105 nm, more preferably 50-100 nm, or a thickness of 0.5-30 nm, 1-2 nm, or 1-1.5 nm, and diameters of 5-45 µm, preferably 10-40 µm, more preferably 15-35 µm. In one embodiment, the r-GO nanoplatelets have a length to thickness aspect ratio of 40:1-1,200:1, preferably 50:1-1,000:1, more preferably 70:1-900:1. Nanoplatelets having dimensions as discussed above may also be referred to as sheets, nanosheets, nanoflakes, nanoparticles, or platelets. In an alternative embodiment, a different carbonaceous nanomaterial may be used in place of the r-GO, such as carbon black (e.g., furnace black and Ketjen black), active carbon, carbon nanorods, carbon nanotubes, carbon fibers, graphene, graphite, expandable graphite, graphene oxide, exfoliated graphite nanoplatelets, thermally reduced graphene oxide, chemically reduced graphene oxide, and mixtures thereof. In another embodiment, the r-GO of the present disclosure may be in the form of sheets having a thickness of 0.5-1.5 nm, or less than 1.5 nm, and having lengths in a range of 50 nm-40 µm, preferably 70 nm-10 µm, more preferably 0.1-5 µm, or 0.5-2 µm. In some cases, two or more sheets of r-GO may be twisted, stuck, or bundled together, leading to a greater combined thickness and/or combined length.

In one embodiment, the nanocomposite, or the nanocubes, has a cobalt to tin molar ratio in a range of 2:1-4:1. In a further embodiment, the nanocomposite, or the nanocubes, has a cobalt to tin molar ratio in a range of 2.0:1-3.5:1, preferably 2.0:1-3.0:1, more preferably 2.0:1-2.5:1, even more preferably 2.0:1-2.2:1, or about 2.0:1. In another embodiment, the nanocomposite, or the nanocubes, has a cobalt to tin molar ratio in a range of 2.2:1-4.0:1, preferably 2.4:1-4.0:1, more preferably 2.8:1-4.0:1, even more preferably 3.0:1-4.0:1, or 3.2:1-4.0:1, or 3.5:1-4.0:1, or 3.8:1-4.0:1, or about 4.0:1.

In one embodiment, the nanocomposite has a carbon to tin molar ratio in a range of 10:1-25:1, preferably 12:1-23:1, more preferably 13:1-21:1, even more preferably 14:1-18:1, or 15:1-17:1, or about 16:1.

In one embodiment, the nanocomposite has an empirical formula of $C_{16}Co_4O_{16}Sn$.

In one embodiment, the nanocomposite consists essentially of carbon, cobalt, oxygen, and tin, meaning that of the total nanocomposite weight, at least 99 wt %, at least 99.5 wt %, at least 99.9 wt %, preferably at least 99.95 wt %, or about 100 wt % is from only carbon, cobalt, oxygen, and tin.

In one embodiment, the nanocomposite has a band gap in a range of 2.92-3.02 eV, preferably 2.93-3.01 eV, more preferably 2.94-3.00 eV, even more preferably 2.95-2.98 eV, or about 2.96 eV, or about 2.9636 eV.

In an alternative embodiment, the nanocubes comprise cobalt hydroxystannate. Here, in a further embodiment, the nanocubes may consist essentially of cobalt hydroxystannate having the formula $CoSn(OH)_6$.

In an alternative embodiment, the nanocomposite consists of nanocubes having an empirical formula of $C_{16}Co_4O_{16}Sn$. Here, the nanocubes may be in the form of cubic crystals and in a space group of F-43c. The cubic crystals may have a density in a range of 1.8-2.3 g/cm$^3$, preferably 1.9-2.2 g/cm$^3$, more preferably 2.0-2.1 g/cm$^3$, and may have a unit cell edge length in a range of 14-20 Å, preferably 16-19 Å, or about 17 Å.

In another alternative embodiment, the nanocomposite comprises nanocubes of $C_{16}Co_4O_{16}Sn$, as described above, on the surface of reduced graphene oxide (rGO).

Referring back to the steps of the method, the mixture is irradiated to photo-catalytically degrade a portion of the organic contaminant. The irradiating may be carried out for a time in a range of 120-200 min, preferably 130-190 min, more preferably 140-180 min, even more preferably 150-170 min, or about 160 min. In one embodiment, the mixture may be continually stirred, shaken, or agitated while irradiating.

In one embodiment, the irradiating involves exposure to UV light. A UV light source may be a mercury or xenon gas discharge lamp, an electric arc, sunlight, a light emitting diode (LED), a laser, a fluorescent lamp, a cathode ray tube, or some other source. In one embodiment, filters, reflectors, collimators, fiber optics, polarizers, and/or lenses may be used to manipulate the light path or properties of the light from the light source. For example, one or more reflectors may be used to focus the light from a mercury gas discharge lamp onto the mixture. Alternatively, a reflector may be positioned on the side of the vessel cavity opposite the light source in order to reflect stray UV light towards the permeate side coating. In one embodiment, two or more light sources may be used, which may be of the same type or different types, and may be positioned on the same side or on different sides of the mixture. As another example, where sunlight is used as a light source, the sunlight may be filtered, reflected, and focused onto the mixture to increase the light intensity while minimizing heating. In one embodiment, a Wood's glass optical filter may be used to allow UV light to pass while blocking other wavelengths. In one embodiment, the UV light has an intensity of 450-1550 mW/cm$^2$, preferably 600-1400 mW/cm$^2$, more preferably 800-1200 mW/cm$^2$ on the mixture. Depending on the composition and morphology of the photocatalyst used, certain UV wavelengths may be more preferable than others. Ideally, the UV wavelength corresponds to an energy equal to or greater than the electronic band gap energy of the nanocomposite.

In a preferred embodiment, the irradiating involves exposure to sunlight. In a further embodiment, one or more optical filters may be used to increase the proportion of visible light being irradiated on the mixture while decreasing the proportion of UV light being irradiated on the mixture.

Without being bound to any particular theory, irradiating the nanocomposite with a wavelength corresponding to the band gap energy or a greater energy may cause the photo-excitation of nanocomposite electrons into a conduction band with a corresponding generation of holes in a valence band. The strong reduction power of the electrons and the strong oxidation power of the holes, in combination with the hydrogen peroxide, may lead to the decomposition of the organic contaminant, preferably into one or more harmless byproducts, which reduces the organic contaminant concentration. In one embodiment, the nanocomposite may cause other reactions, such as hydrolysis and/or water splitting. In one embodiment, at least 75%, at least 78%, at least 80%, at least 85%, at least 90%, at least 95%, or at least 99%, or about 100% of the organic contaminant is degraded, relative to an amount of organic contaminant before the irradiating. The amount of organic contaminant may be monitored by UV-Vis spectrophotometry of the solution, or by other measurements, such as dynamic light scattering or conductance measurements. Thus, the portion of the organic contaminant that is photo-catalytically degraded may be at least 75 wt %, at least 78 wt %, at least 80 wt %, at least 85 wt %, at least 90 wt %, at least 95 wt %, or at least 99 wt %, or about 100 wt % of the initial organic contaminant weight.

In one embodiment, the method may further comprise removing the nanocomposite after the irradiating and reusing in a second solution. Here, the nanocomposite may be cleaned before being mixed with the second solution.

In an alternative embodiment, the nanocomposite may be fixed to a solid support such as a magnetic support, or may be confined within a porous compartment within the solution.

According to a second embodiment, the present disclosure relates to a method of enhancing the efficiency of a liquid fuel. The method involves mixing a nanocomposite with the liquid fuel to produce an enhanced liquid fuel. The nanocomposite is present in the enhanced liquid fuel at a concentration in a range of 15-120 ppm, preferably 18-110 ppm, more preferably 20-100 ppm, even more preferably 25-95 ppm, or 30-90 ppm, or about 90 ppm.

The nanocomposite may be as previously described in the first aspect of this disclosure. For instance, in one embodiment, the nanocomposite comprises tin cobalt oxide nanocubes and graphene oxide. In one embodiment, the nanocubes have a cobalt to tin molar ratio in a range of 2:1-4:1. In one embodiment, the nanocomposite has the empirical formula $C_{16}Co_4O_{16}Sn$.

Preferably, the enhanced liquid fuel has a calorific value that is greater than the calorific value of the liquid fuel. As used herein, "enhancing the efficiency of a liquid fuel" refers to increasing in the calorific value of the liquid fuel. The calorific value may be considered equivalent to heating value or energy value, and is the total energy released as heat when a substance undergoes complete combustion with oxygen under standard conditions.

In one embodiment, a calorific value of the enhanced liquid fuel is between 20-40 times, preferably 22-38 times, more preferably 25-37 times, even more preferably 30-36 times, or about 35 times the calorific value of the liquid fuel. In one embodiment, the enhanced liquid fuel has a calorific value in a range of 10-40 kJ/g, preferably 12-35 kJ/g, more preferably 15-32 kJ/g. For comparison, pure kerosene oil has a calorific value of about 920 J/g. In one embodiment, the calorific values represented herein may be lower heating values (LHV) or higher heating values (HHV).

In one embodiment, the liquid fuel is at least one selected from the group consisting of kerosene fuel, diesel fuel, gasoline fuel, biodiesel fuel, alcohol fuel, and synthetic fuel. Alcohol fuels include, but are not limited to, methanol, ethanol, 1-propanol, isopropanol, n-butanol, isobutanol, tert-butanol, n-pentanol, isoamyl alcohol, and mixtures thereof. Synthetic fuels include, but are not limited to dimethyl ether (DME), fuel produced from processes such as Fischer-Tropsch conversion, methanol to gasoline conversion, or direct coal liquefaction. Preferably the liquid fuel is kerosene fuel, diesel fuel, gasoline fuel, or biodiesel fuel. In one preferred embodiment, the liquid fuel is a kerosene fuel. Kerosene is also known as kerosene oil, kerosene, paraffin, lamp oil, and coal oil, and is a combustible hydrocarbon liquid derived from petroleum. It is widely used as a jet fuel as well for household uses, such as cooking, heating, and lighting.

In one embodiment, the nanocomposite may be added to the liquid fuel as part of a composition having other ingredients. The nanocomposite may be present in the composition at a weight percentage in a range of 0.1-99 wt %, 10-90 wt %, 20-80 wt %, 1-10 wt %, 10-20 wt %, 20-30 wt %, 30-40 wt %, 40-50 wt %, 50-60 wt %, 60-70 wt %, 70-80 wt %, or 90-98 wt %, relative to a total weight of the composition. The composition may be a liquid or solid, and the composition may be in the form of pills, pellets, beads, capsules, cartridges, tablets, rods, or powders, and may optionally be further coated, encapsulated, or doped as desired.

The composition may comprise other compounds including but not limited to a fuel-soluble wax, an ethylene vinyl acetate, and amine detergent (such as a polyamine, an aliphatic hydrocarbon-substituted amine, a polyalkylamine, a polyetheramine, a polyalkyl succinamide, a polyalkyl aminophenol, a product produced by reacting an acid with the reaction product of a vegetable oil and a polyamine, or a combination comprising one or more of the foregoing amine detergents), a polyolefin polymer, a carrier fluid, an agent for reducing soot, a tetra-alkyl lead compound, methylcyclopentadienyl manganese, a lead scavenger, a dye, an antioxidant, a corrosion inhibitor, a bacteriostatic agent, an auxiliary dispersant or detergent, a gum inhibitor, a metal deactivator, an emulsifier, a demulsifier, an anti-valve seat recession additive, an anti-icing agent, a lubricating agent, a flow improver, an anti-wear additive, a pour point depressant, a cetane improver, a cloud point depressant; a wax anti-settling additive; a wax crystal modifier; a cold flow improver; a water removal agent (such as, for example, succinic anhydride, phthalic anhydride, benzoic anhydride, acetic anhydride, maleic anhydride, propionic anhydride, naphthalic anhydride, glutaric anhydride, and/or itaconic anhydride), or a combination of one or more of the foregoing additives.

As mentioned above, the composition may comprise a carrier fluid. Suitable carrier fluids include, for example, hydrocarbon-based materials such as polyisobutylenes (PIB's), polypropylenes (PP's) and polyalphaolefins (PAO's), all of which may be hydrogenated or unhydrogenated; polyether based materials such as polybutylene oxides (poly BO's), polypropylene oxides (poly PO's), polyhexadecene oxides (poly HO's) and mixtures thereof (i.e. both (poly BO)+(poly PO) and poly BO–(PO)); and mineral oils such as those sold by member companies of the Royal Dutch/Shell group under the designations "HVI" and "XHVI" (trade mark), Exxon Naphthenic 900 SUS mineral oil and high viscosity index oils in general.

A carrier fluid, when employed in the composition, may comprise about 1 wt % to about 99.5 wt % of the total weight of the composition. In another embodiment, the carrier fluid comprises about 10 wt % to about 50 wt % of the total weight of the composition. When the composition comprises the fuel detergent PIBA, the carrier fluid and the PIBA may be present in substantially equal amounts by weight in the composition.

In another embodiment, the composition may comprise a polyolefin polymer and/or their corresponding hydrogenated derivatives in an amount effective for controlling valve deposits in engines. In combination with a detergent, for example, such additives may act as total deposit control additives (TDC) to reduce deposits on fuel injectors, valves, and intake ports of internal combustion engines. Suitable polyolefins that can be employed include polymers prepared from monoolefins and diolefins, or copolymers of either having an average molecular weight of about 500 to about 3,500 Da. Olefins, which can be used to prepare such polyolefin polymers, include ethylene, propylene, butene, isobutene, amylene, hexylene, butadiene, and isoprene. In one embodiment, the polyolefin polymer is a hydrogenated polybutene. The hydrogenated polybutenes can have molecular weights of about 700 to about 1100 Da, or about 800 to about 1000 Da.

The composition may comprise other additives such as an agent for reducing soot, a pour point depressant, a cetane improver, tetra-alkyl lead compounds, MMT, lead scavengers such as halo-alkanes, dyes, antioxidants such as hindered phenols, corrosion inhibitors such as alkylated succinic acids and anhydrides and derivatives thereof, bacteriostatic agents, auxiliary dispersants, detergents, gum inhibitors, metal deactivators, emulsifiers, demulsifiers, anti-valve seat recession additives such as alkali metal sulphosuccinate salts, anti-icing agents, lubricating agents, flow improvers, anti-wear additives, and combinations comprising one or more of the foregoing additives.

Suitable antioxidants that can be added to the composition include, for example, metal dithiophosphates and metal dithiocarbonates. One particular antioxidant additive is a phenolic antioxidant, 4,4'-methylene-bis(2,6-di-tert-butylphenol), which is commercially available under the tradename ETHYL 702 (Ethyl Corporation). Antioxidants are particularly advantageous when the composition comprises a detergent. An antioxidant, when employed in the composition may comprise from about 0.01 wt % to about 5 wt % of the total weight of the composition.

Anti-wear agents, such as sulfur, metal naphthenates, phosphate esters, and sulfurized hydrocarbons, etc., may also be used as in the composition. One such additive is zinc dibutyldithio-carbamate, which is commercially available as BUTYL ZIMATE (R. T. Vanderbilt Company).

Flow improvers such as anti-gel and cold flow additives including copolymers of ethylene and vinyl esters of fatty acids with molecular weight of 500-50,000 Da; a tallow amine salt of ophthalmic anhydride; tallow amine salt of dithio-benzoic acid; a 4-hydroxy,3,5-di-t-butyl dithiobenzoic acid; or an ethylene-vinyl acetate copolymers may also be added to the composition.

The composition may also comprise a lubricating agent such as, for example, carboxylic acid polyol esters, dimer acid, polyol esters, castor oil, vegetable oils, fatty methyl esters (e.g., rapeseed), glycol esters, particularly oleates and linoleates (unsaturated). Specific examples of lubricating agents include glycerol monooleate, or fatty formates, or fatty amides or 1,2-alkane diols.

Stabilizers such as, for example, a hydrocarbyl polyoxypropylene di(polyoxyethylene) amine may be used in the composition.

Emission (e.g., CO and nitrogen oxide) reducing agents may also be used in the composition. For example, about 0.01 to about 1.0 ppm of fuel-soluble organometallic platinum compound in an oxygenated solvent such as octyl nitrate can be used as an emission reducing additive. Another example of an emission reducing agent includes dibenzyl cyclooctadiene platinum II in octyl nitrate. Mixtures of alcohol, toluene, and hydrogen peroxide may also be employed. A composition comprising an admixture of about 6 vol % of di-tertiary butyl peroxide, about 1 vol % of tall oil imidazoline, about 0.5 vol % of neo-decanoic acid, and the balance being a hydrocarbon solvent carrier thoroughly mixed with the peroxide, imidazoline, and acid may also be employed as an emission reducing agent.

Demulsifiers, such as, for example, polyoxyethylene ethers, organic sulfonates, polyoxyalkylene glycols, oxyalkylated phenolic resins, and combinations comprising one or more of the foregoing demulsifiers may also be used in the composition. The composition may also comprise fuel dyes (such as Solvent Red 24, Solvent Red 26, Solvent Yellow 124, or Solvent Blue 35), ether, nitromethane, acetone, ferrous picrate, nitrous oxide, methanol, ethanol, isopropyl alcohol, n-butanol, and/or gasoline grade t-butanol.

The composition may comprise a matrix. In one embodiment, the matrix is soluble in the automotive or motor vehicle functional fluid to which the composition is to be added. Illustrative examples of functional fluids include fuels for internal combustion engines, radiator fluids, brake fluids, hydraulic fluids, transmission fluids, power steering fluids, lubricants, and the like. In a preferred embodiment, the functional fluid is kerosene fuel. In another embodiment, the matrix need not be soluble in the functional fluid.

In one embodiment, the composition may comprise the nanocomposite but no other types of nanoparticles. In another embodiment, the composition may comprise only tin cobalt oxide nanocubes and no other types of nanoparticles. In one embodiment, the composition may comprise the nanocomposite and no other source of metal. In one embodiment, the composition may comprise the nanocomposite, lead, and no other source of metal. However, in other embodiments, the enhanced liquid fuel may consist essentially of the liquid fuel and the nanocomposite.

In one embodiment the enhanced liquid fuel may be used as an automotive fuel. The term 'automotive' as used herein generally refers to motor vehicles used to transport or move people or objects from one location to another as well as to stationary objects powered by internal combustion engines, turbines, fuel cells, batteries and the like. Illustrative motor vehicles, include, but are not limited to, cars, buses, trucks, boats, ships, construction and building equipment, and the like, whether such vehicles are powdered by internal combustion engines, turbines, fuel cells, batteries, or a combination thereof. In other embodiments, the enhanced liquid fuel may be used for trains, aircraft, generators, heaters (space heaters or water heaters), or cooking.

In one embodiment, the method only consists of mixing the nanocomposite with the liquid fuel to produce the enhanced liquid fuel. For instance, only the nanocomposite is mixed with the liquid fuel, and no other compounds are added to the enhanced liquid fuel prior to combustion. In a related embodiment, the method only consists of adding a composition comprising the nanocomposite to the liquid fuel to produce the enhanced liquid fuel, and no other compounds are added to the enhanced liquid fuel prior to combustion.

In one embodiment, the liquid fuel and the enhanced liquid fuel is located in a fuel tank, such as on a vehicle, and the method involves adding the nanocomposite, or a composition comprising the nanocomposite, directly into the fuel tank. Alternatively, the method may involve mixing the nanocomposite, or a composition comprising the nanocomposite, into a volume of liquid fuel, which may later be transferred to a vehicle or machinery for combustion.

In one embodiment, the liquid fuel and the enhanced liquid fuel have specific gravities having a percent difference of 0.7% or less, preferably 0.6% or less, more preferably 0.5% or less, even more preferably 0.45% or less. As used herein, "percent difference" when comparing two numerical values, refers to the absolute difference between the two values, divided by the average of the two values, all multiplied by 100. In a one embodiment, the enhanced liquid fuel has a specific gravity in a range of 0.7800-0.7900 g/cm$^3$, preferably 0.7820-0.7890 g/cm$^3$, more preferably 0.7840-0.7886 g/cm$^3$, even more preferably 0.7878-0.7884 g/cm$^3$.

In one embodiment, a kinematic viscosity of the enhanced liquid fuel is 50-85% greater, preferably 55-82% greater, more preferably 60-80% greater than a kinematic viscosity of the liquid fuel. In one embodiment, the enhanced liquid fuel has a kinematic viscosity in a range of 5.75-7.00 mm$^{-2}$·s$^{-1}$, preferably 5.80-6.80 mm$^{-2}$·s$^{-1}$, more preferably 6.00-6.70 mm$^{-2}$·s$^{-1}$.

In one embodiment, the enhanced liquid fuel may have a lower flash point, fire point, cloud point, and/or pour point than the liquid fuel. The flash point of a volatile material is the lowest temperature at which vapors of the material will ignite, when given an ignition source. In one embodiment, the enhanced liquid fuel has a flash point of 35° C. or lower, preferably 34° C. or lower, more preferably 32° C. or lower, 31° C. or lower, 30° C. or lower, 29° C. or lower, 28° C. or lower, or 27° C. or lower. Pure kerosene may have a flash point of about 42° C. Methods for determining the flash point of a liquid are specified in many standards. For example, testing by the Pensky-Martens closed cup method is detailed in ASTM D93, IP34, ISO 2719, DIN 51758, JIS K2265 and AFNOR M07-019. Determination of flash point by the small scale closed cup method is detailed in ASTM D3828 and D3278, EN ISO 3679 and 3680, and IP 523 and 524. CEN/TR 15138 *Guide to Flash Point Testing* and ISO TR 29662 *Guidance for Flash Point Testing* cover the key aspects of flash point testing.

The fire point of a fuel is the lowest temperature at which the vapor of that fuel will continue to burn for at least 5 seconds after ignition by an open flame of standard dimension. In comparison, at the flash point, a lower temperature, a substance will ignite briefly, but vapor might not be produced at a rate to sustain the fire. The fire point may be measured according to the ASTM D92 standard. In one embodiment, the enhanced liquid fuel has a fire point of 43° C. or lower, preferably 42° C. or lower, more preferably 41° C. or lower, even more preferably 40° C. or lower, or 39° C., 38° C., 37° C., 36° C., 35° C., 34° C., 33° C., 32° C., or 31° C. Pure kerosene may have a fire point of about 49° C.

The cloud point refers to the temperature below which wax in a liquid fuel forms a cloudy appearance. The presence of solidified waxes thickens the fuel and clogs fuel filters and injectors in engines. The wax also accumulates on cold surfaces (producing, for example, pipeline or heat exchanger fouling) and forms an emulsion with water. Therefore, cloud point indicates the tendency of the fuel to plug filters or small orifices at cold operating temperatures. In one embodiment, the enhanced liquid fuel has a cloud point of 8° C. or lower, preferably 7° C. or lower, more preferably 6° C. or lower, even more preferably 5° C. or lower, 4° C. or lower, 3° C. or lower, 2° C. or lower, or 1° C., 0° C., −1° C., or −2° C. The cloud point of pure kerosene may be about 9° C. The cloud point may be measured manually by the ASTM D2500 standard or automatically by the ASTM D5773 standard.

The pour point of a liquid is the temperature below which the liquid loses its flow characteristics, and may be measured manually by the ASTM D97 standard or automatically by the ASTM D5949 standard. In one embodiment, the enhanced liquid fuel has a pour point of −17° C. or lower, preferably −19° C. or lower, more preferably −20° C. or lower, even more preferably −22° C. or lower, or −25° C. or lower, or −28° C. or lower, or −30° C., or −32° C., or −35° C., or −40° C. The pour point of pure kerosene may be about −15° C.

The examples below are intended to further illustrate protocols for preparing, characterizing the nanocomposite, and uses thereof, and are not intended to limit the scope of the claims.

Example 1

Materials and Methods

SnCl$_4$.5H$_2$O, CoCl$_2$.6H$_2$O and pellets of sodium hydroxide (NaOH) were used for the synthesis of nanocubes. Graphite powder, potassium permanganate (KMnO$_4$), sodium nitrate (NaNO$_3$), sulfuric acid (H$_2$SO$_4$ 98%), and hydrogen peroxide (H$_2$O$_2$) were used for the synthesis of graphene oxide. Ethylene glycol was used for the synthesis of the nanocomposite. All chemicals were analytical grade and used without further purification. Deionized water was used throughout the experimental work.

Synthesis of Nanoparticles

Cobalt tin oxide nanoparticles were synthesized by a simple hydrothermal technique. In a typical approach, 0.3 g (SnCl$_4$-5H$_2$O) and 0.6 g (CoCl$_2$.6H$_2$O) with an atomic ratio of 1:2 were mixed in 30 mL of deionized water under constant magnetic stirring for 30 minutes at 500 rpm. After some time, they were completely dissolved. Then 7 mL of a 4 M NaOH solution was added slowly into the solution. For further purification, the solution was treated in a Teflon®- lined stainless steel hydrothermal reactor autoclave and the temperature was maintained at 200° C. for 5 hours. After 5 hours, the hydrothermal autoclave reactor was allowed to naturally cool to room temperature for several hours. The precipitates of the product were collected centrifuging and were washed with ethanol and distilled water. The obtained product was dried in an oven at 60° C. for 24 hours. See S. Jamil, et al., First Synthetic Study of Cube-Like Cobalt Hydroxystannate Nanoparticles as Photocatalyst for Drimarene Red K-4BL Degradation and Fuel Additive, J. Cluster Sci., 2018, 29, 685-696, incorporated herein by reference in its entirety.

Synthesis of Graphene Oxide (GO)

GO was synthesized by taking 90 mL of 99% pure $H_2SO_4$ and 2.1 g of 98% $H_3PO_4$ and stirring for one hour. After one hour of stirring at 500 rpm, 2 g of graphite flakes were added to the solution in a 500 mL volumetric flask in an ice bath and the temperature was maintained at 0-5° C. for two hours. 15 g of $KMnO_4$ powder was slowly added into the suspension during the next three hours of stirring at 500 rpm and the temperature was maintained at 15-20° C. After 6 hours, 184 mL $H_2O$ was carefully added into the solution under constant stirring and the temperature was maintained at 60-70° C. After completing 8 hours of stirring at 500 rpm, the solution passed into the reflux system for 20-25 minutes at 100° C. temperature. After refluxing, the solution was cooled down to 30° C. and this temperature was maintained for 4 hours and then 40 mL of hydrogen peroxide was added into the solution. The color of the solution quickly changed, and the bubbles of the suspension from the flask were noted. In the last step, the solution was divided into three beakers and then 150 mL of water was added into each beaker and they were left overnight. The pH of the solution was maintained by a process of centrifuging several times. The solution was placed in an oven at 60° C. and the product was dried and used for further analysis.

Synthesis of the Nanocomposite

The tin cobalt oxide based nanocomposite was synthesized by a simple solvothermal method by changing the solvents and conditions of the reaction. The results of these variations are discussed in Experimental section. In the end, the conditions and solvent that gave an advantageous result were determined. Typically in this method, 60 mL of ethylene glycol was added as the solvent into which 0.15 g of graphene oxide was mixed during 40 minutes of stirring on magnetic plates at 500 rpm. After mixing graphene oxide into the solvent, 0.31 g of tin cobalt oxide was slowly added into the solution and stirred again for one hour. After stirring for one hour, the solution was placed in a Teflon lined stainless steel autoclave for 4 hours at 200° C. for further purification. After passing this 4 hour time period, the autoclave was placed at room temperature and the solution was cooled down naturally. The precipitate of the solution was collected by centrifuging several times. The product was dried in the oven at 60° C. overnight. The dried product was placed in an electric furnace for calcination at 400° C. for 5 hours.

Example 2

Characterization

Powder XRD patterns of the nanoparticles were obtained from a Rigaku D/max Ultima III X-ray diffractometer with a radiation source of Cu-Kα (wavelength=1.54174 Å) at 45 kV and 60 mA at a scanning step size of 0.020° in the 2θ range 10.015-80.012°. The XRD results were analyzed with the help of MATCH 3 software and the lattice parameters were calculated. The structural model was constructed on VESTA software. Scanning electron microscopic calculations were performed at 250 Quanta with a pressure of 70 (Pa) and 30 kV power. The patterns showed the cubic crystal structure of these nanoparticles. The catalytic reduction and absorption spectrum of the synthetic dye RB 5 was examined by a Halo DB 20 double beam spectrophotometer with the wavelength range of 400-700 nm. Investigation of the fuel properties by adding the newly synthesized graphene based tin cobalt oxide nanocomposite into the fuel to check the effect on the fuel efficiency was carried out in which the flash and fire point was monitored by the APEXJCX309 Closed Cup Flash Point Tester. An APEX-JCX406 oxygen bomb calorimeter was used to calculate the calorific value of the fuel. Specific gravity values were calculated by the gravity meter DA-640.

Example 3

Results and Discussion—EDX Analysis

Energy Dispersive X-ray (EDX) analysis of the synthesized nanocomposite elements is shown in FIG. 1. The EDX spectrum describes the presence of Co, oxygen, tin, and carbon atoms in the newly synthesized $C_{16}Co_4O_{16}Sn$ nanocomposite. It can be seen from Table 1 that the atom percentage of Co is more than half of all the elements present in the nanocomposite.

TABLE 1

| EDX elemental microanalysis (atom %) of the $C_{16}Co_4O_{16}Sn$ nanocomposite sample | | | | |
|---|---|---|---|---|
| Sample | Co (%) | Sn (%) | O (%) | C (%) |
| GO based cobalt tin oxide composite | 54.55 | 14.45 | 16.63 | 14.27 |

Example 4

XRD Results of Graphene Oxide and the Composite

Figure 2A:
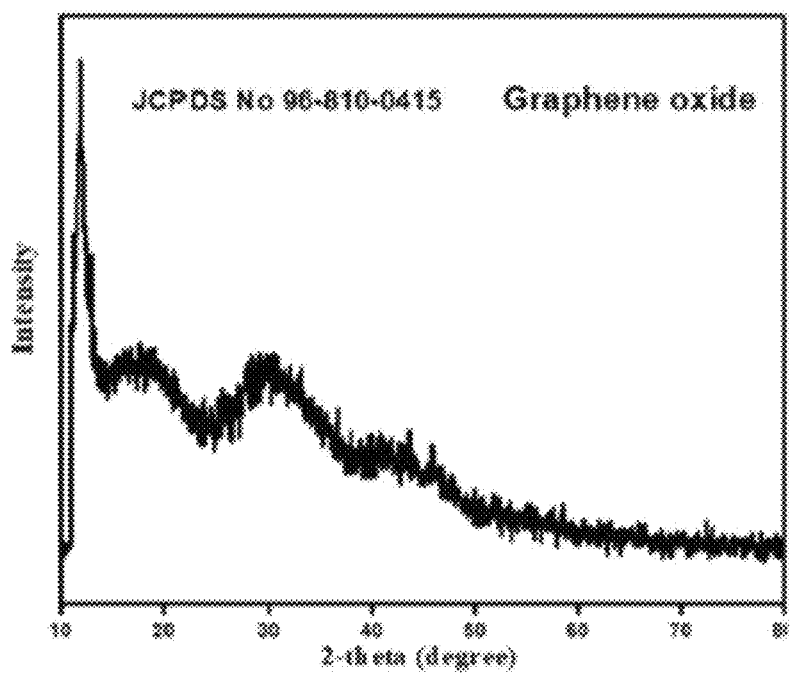
FIG. 2A is an XRD pattern of GO.
Figure 2B:
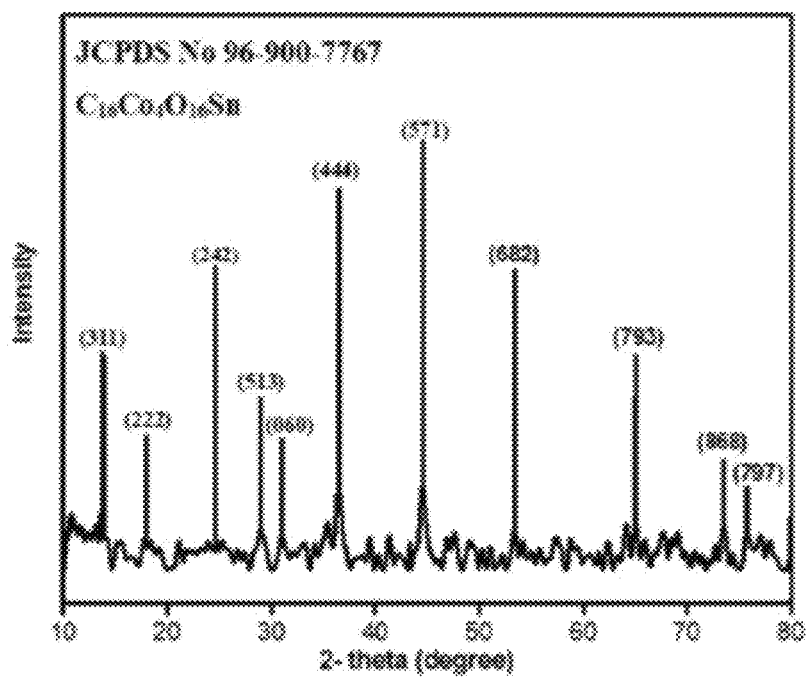
FIG. 2B is an XRD pattern of the $C_{16}Co_4O_{16}Sn$ nanocomposite.

FIG. 2A shows the XRD pattern of GO in the 2-theta range 10-80°. One sharp diffraction peak at 12.521° with the (001) hkl plane is observed. This diffraction peak is characteristic of GO (JCPDS 96-810-0415). GO typically contains some functional groups (OH, —COOH etc.) along with water molecules. During reduction, GO loses water molecules upon treatment in a furnace at high temperature or sometimes gets fully rid of functional groups by heating at more than 1000° C. In FIG. 2B, the X-ray diffraction pattern of $C_{16}Co_4O_{16}Sn$ can be seen. The XRD pattern of cobalt tin oxide nanoparticles is discussed in a previous article. See Jamil et al. (2018) as cited previously. In FIG. 2B, straight sharp diffraction peaks explain that the product is pure and well crystallized. Strong and sharp diffraction peaks at the 2-theta values 15.621°, 17.541°, 25.453°, 28.504°, 30.744°, 33.241°, 36.203°, 45.443°, 53.191°, 63.961°, 73.513° and 75.793°, which are associated with hkl planes (311), (222), (242), (513), (060), (444), (571), (682), (793), (868) and (797), respectively, can be seen. These sharp diffraction peaks are characteristic of the newly synthesized GO based tin cobalt oxide nanocomposite ($C_{16}Co_4O_{16}Sn$, JCPDS no 96-900-7767). The product investigation report, in which crystal parameters, cell parameters, space groups, atomic co-ordinates, lattice parameters, bond lengths, bond angels, volume, density, and d-spacing are shown in Table 2.

Figure 3A:
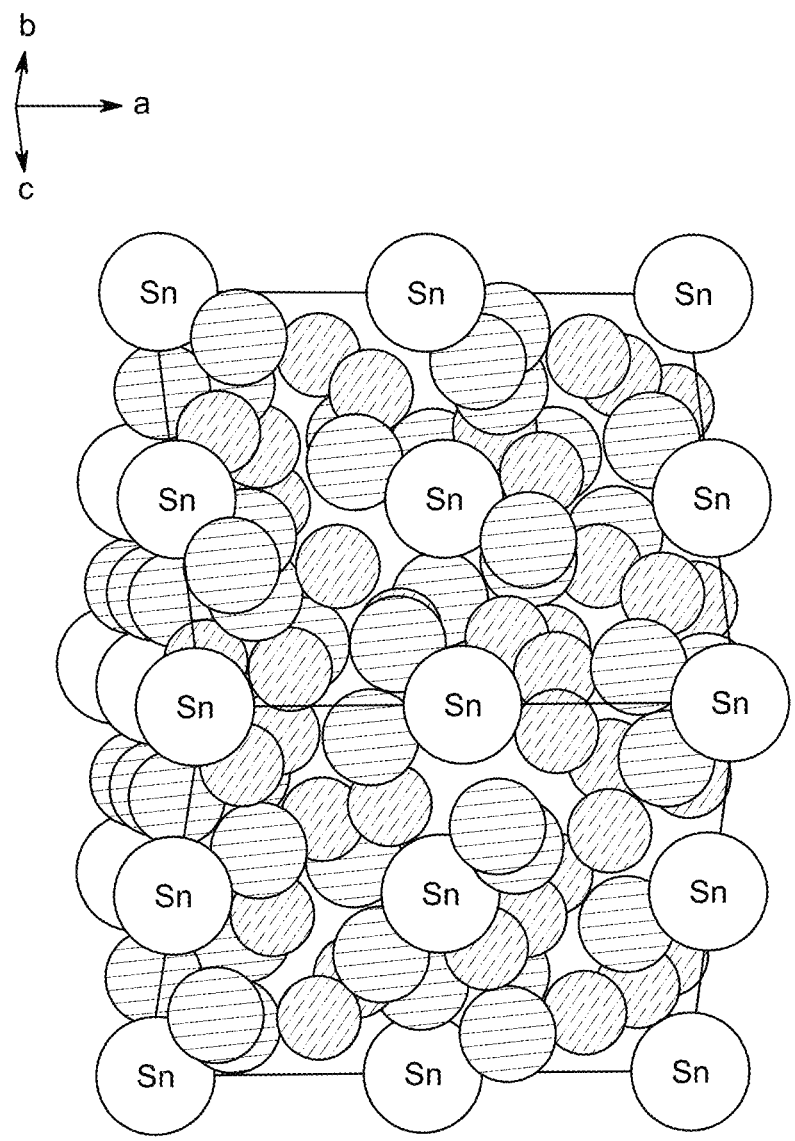
FIG. 3A is a structural model of the $C_{16}Co_4O_{16}Sn$ nanocomposite, showing the tin atoms in the cubic lattice.
Figure 3B:
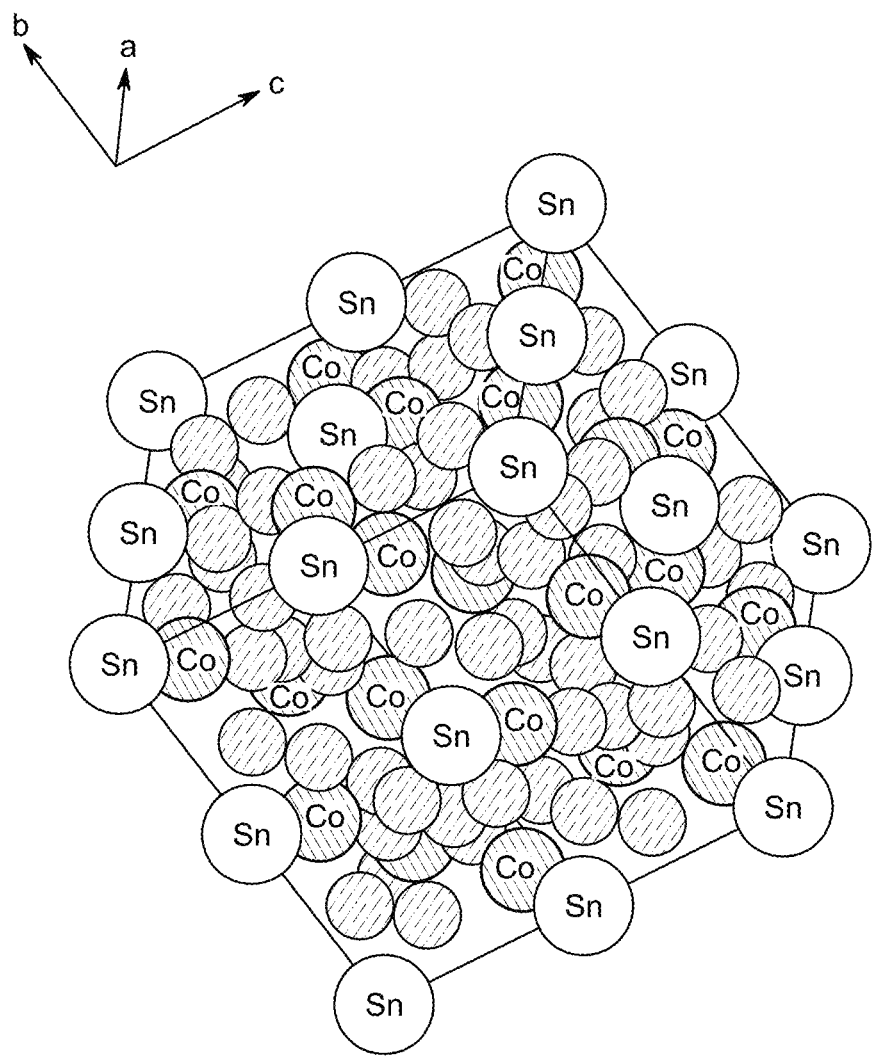
FIG. 3B is a structural model of the $C_{16}Co_4O_{16}Sn$ nanocomposite, showing a different view.
Figure 3C:
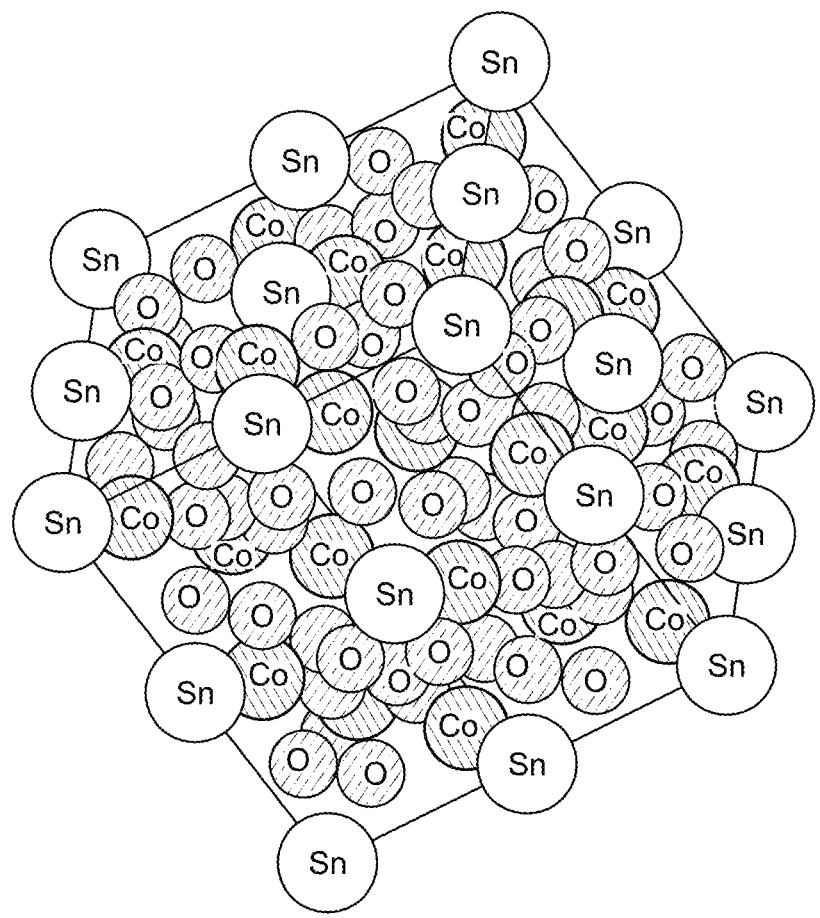
FIG. 3C is a structural model of the $C_{16}Co_4O_{16}Sn$ nanocomposite, showing another view.
Figure 3D:
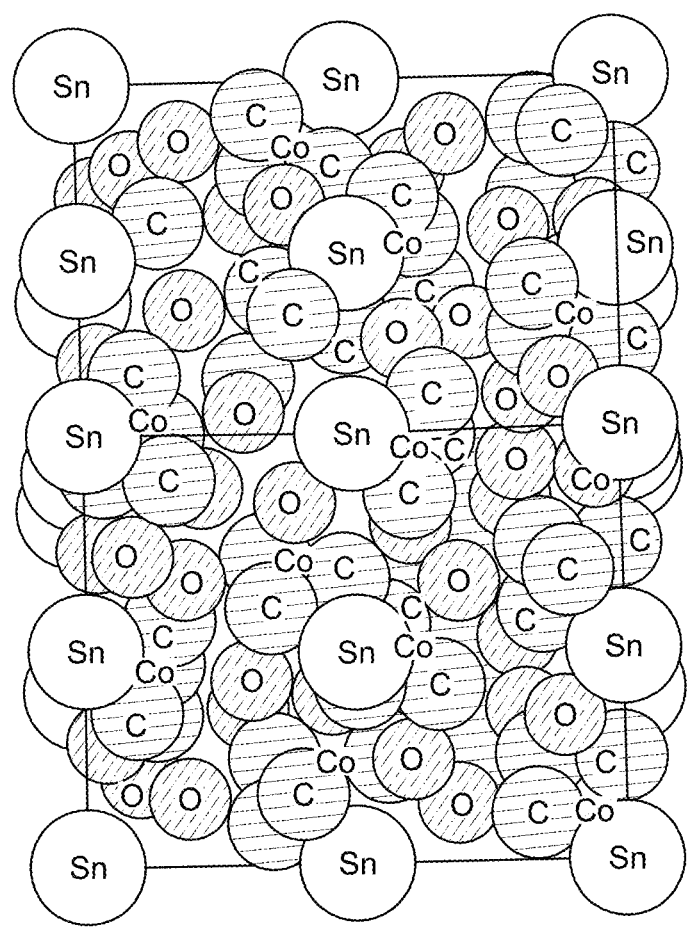
FIG. 3D is a structural model of the $C_{16}Co_4O_{16}Sn$ nanocomposite, showing another view.
Figure 3E:
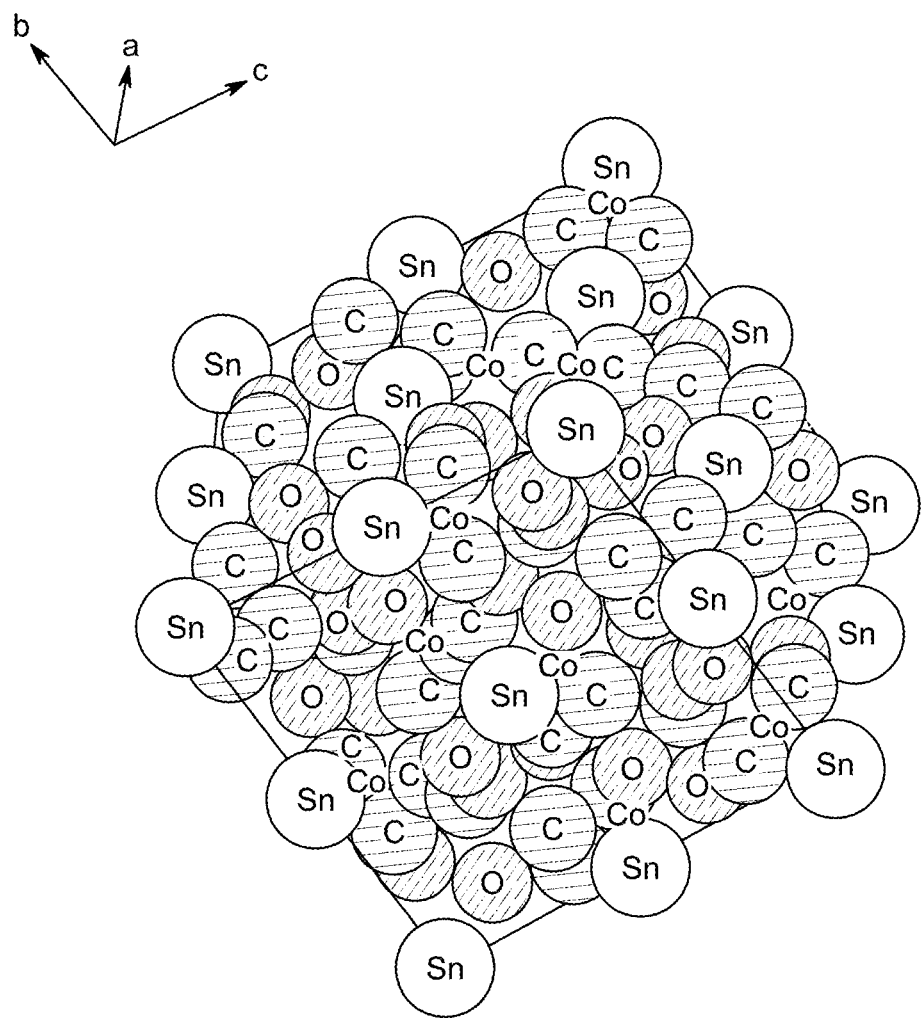
FIG. 3E is a structural model of the $C_{16}Co_4O_{16}Sn$ nanocomposite, with a different view and with all atoms labeled.
Figure 3F:
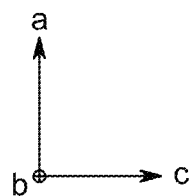
FIG. 3F is a structural model of the $C_{16}Co_4O_{16}Sn$ nanocomposite, showing another view.
Figure 3F:
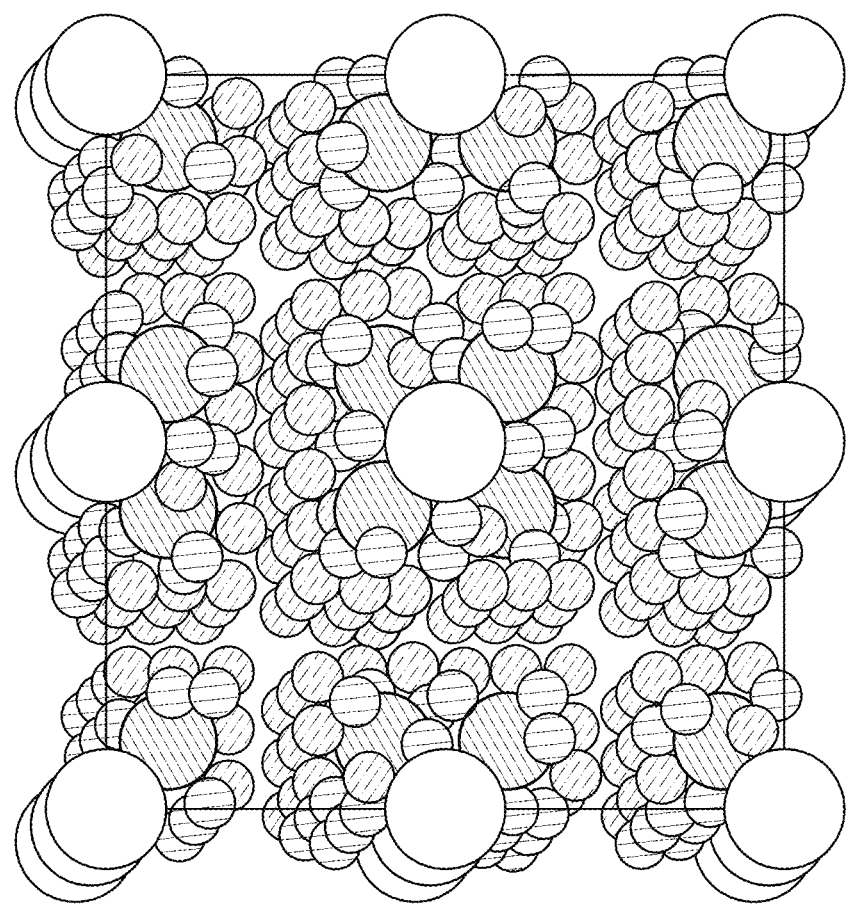
Figure 3G:
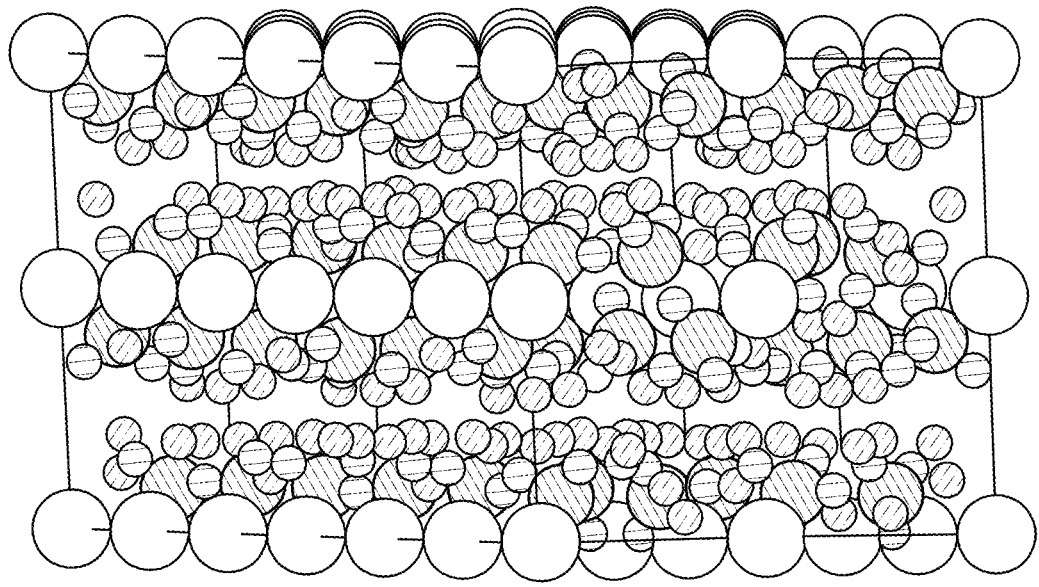
FIG. 3G is a structural model of the $C_{16}Co_4O_{16}Sn$ nanocomposite, showing another view.

Detailed study of the diffraction peaks illustrates that the synthesized $C_{16}Co_4O_{16}Sn$ nanocomposite possesses a cubic lattice structure with a space group of F-43c. FIG. 3A shows that the Sn atoms are located at the corner of the cube while FIG. 3B shows that the cobalt atoms which are represented with a blue color are present at the center of the walls of the cube and FIGS. 3C-3D describes the presence of oxygen atoms in the center of the cube. The positions of all the atoms of the product are shown in FIG. 3E. The positions and arrangement of all the atoms over the carbon atoms can be seen in FIG. 3F. The three dimensional cubic lattice with the placement of all atoms is described in FIG. 3G.

TABLE 2

Summmy of parameters obtained from XRD analysis of product $C_{16}Co_4O_{16}Sn$

| Parameters | Results |
| --- | --- |
| Space group | F-43c |
| Space group number | 219 |
| Crystal system | Cubic |
| Cell parameters | |
| A | 17.2550 Å |
| B | 17.2550 Å |
| C | 17.2550 Å |
| Angles | |
| α | 90° |
| β | 90° |
| γ | 90° |
| Atomic coordinates | |
| x, y and z coordinates of Sn | 0.000, 0.000 and 0.000 |
| x, y, and z coordinates of Co | −0.089, −0.089 and −0.089 |
| x, y, and z coordinates of O | −0.193, 0.043 and −0.109 |
| x, y, and z coordinates of C | −0.151, −0.007 and −0.099 |
| Calculated density | 2.07500 g cm$^{-3}$ |
| I/I$_{cor}$ | 5.800000 |
| 2-Theta, d-spacing and miller indices (hkl) | 15.621°, 5.2026 Å and (311) |
| | 17.541°, 4.9811 Å and (222) |
| | 25.453°, 3.5222 Å and (242) |
| | 30.744°, 2.9166 Å and (513) |
| | 33.241°, 2.8758 Å and (060) |
| | 36.203°, 2.4902 Å and (444) |
| | 45.443°, 1.9924 Å and (571) |
| | 53.191°, 1.6920 Å and (682) |
| | 63.961°, 1.4635 Å and (793) |
| | 73.513°, 1.3474 Å and (868) |
| | 75.793°, 1.2897 Å and (797) |

Example 5

SEM and TEM Analysis of the Nanoparticles

Figure 4A:
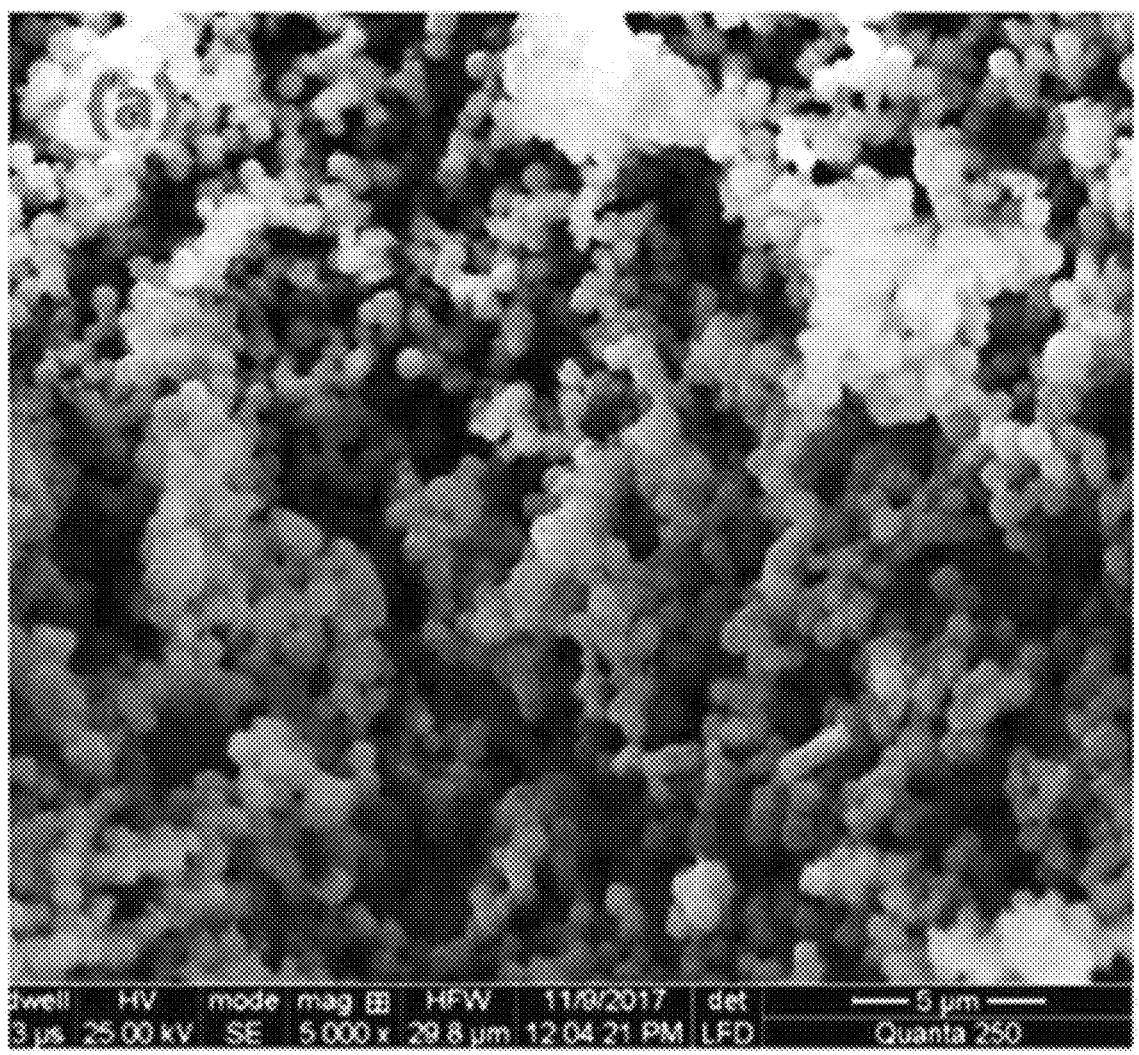
FIG. 4A is an SEM of simple tin cobalt oxide nanoparticles.
Figure 4B:
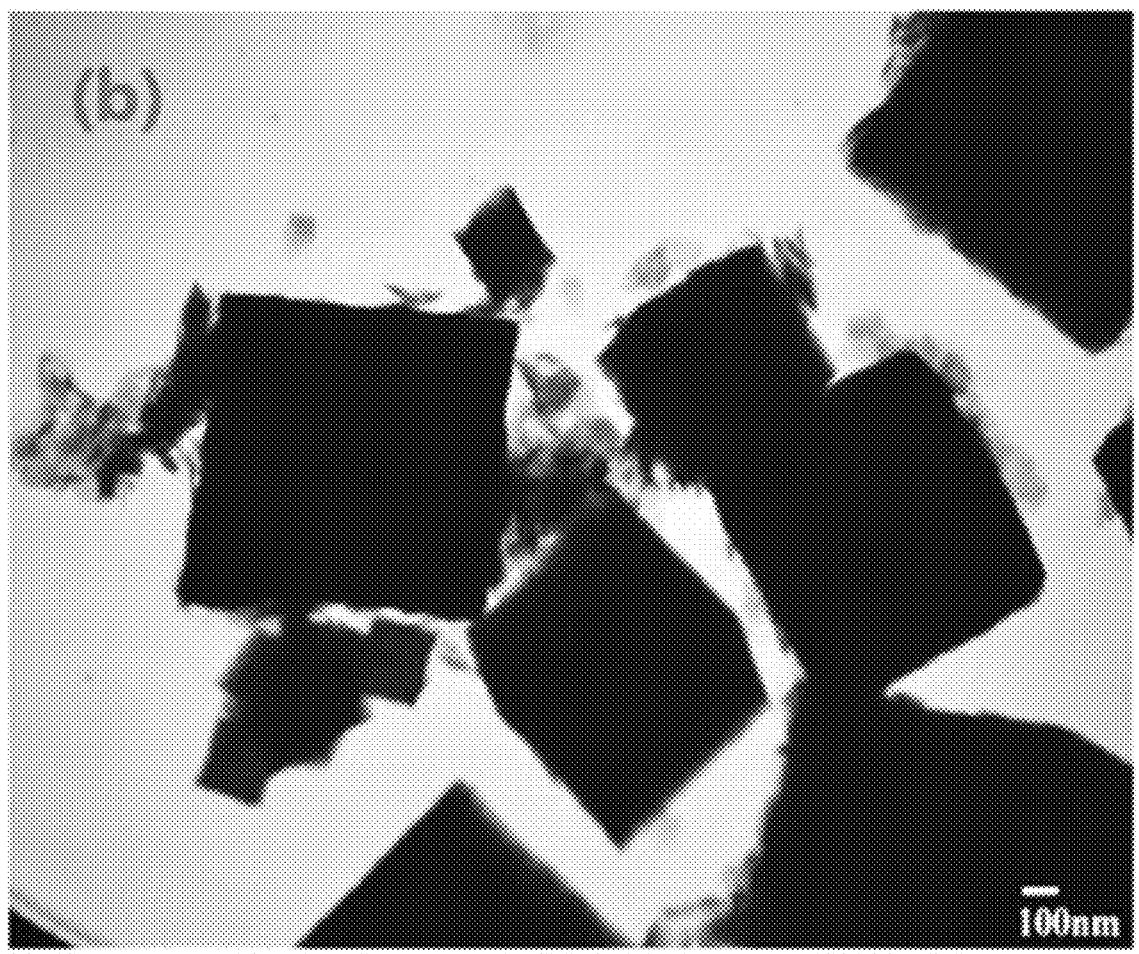
FIG. 4B is a TEM of simple tin cobalt oxide nanoparticles.

SEM and TEM images of the tin cobalt oxide nanoparticles are given in FIGS. 4A and B, respectively. In FIG. 4A, the SEM image of the simple tin cobalt oxide nanoparticles with a magnification of 5,000× can be seen. A number of small cubes are visible in this image. Similarly, the TEM image of the simple tin cobalt oxide at a magnification of 50,000× can be seen in FIG. 4B. The size of these particles lies in the 70-200 nm range.

Example 6

SEM Analysis of the Nanocomposite

Figure 5A:
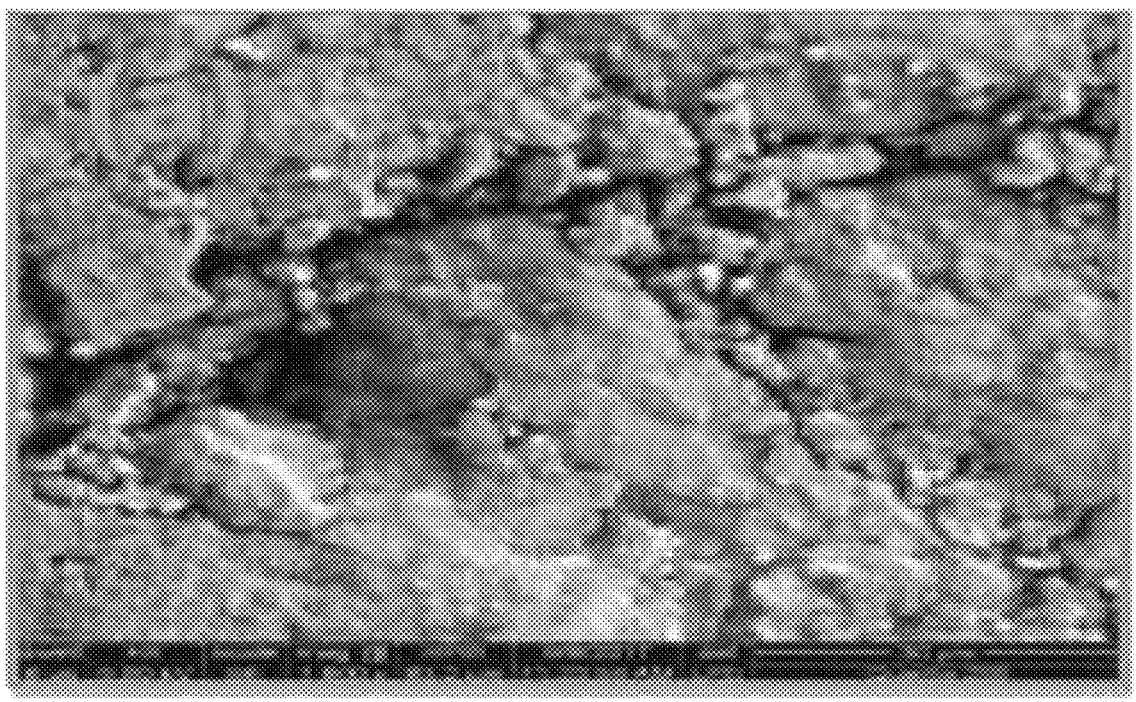
FIG. 5A shows an SEM image of a first attempt at forming the nanocomposite, which involved using benzene as a solvent and autoclaving at 150° C. for 4 h.
Figure 5B:
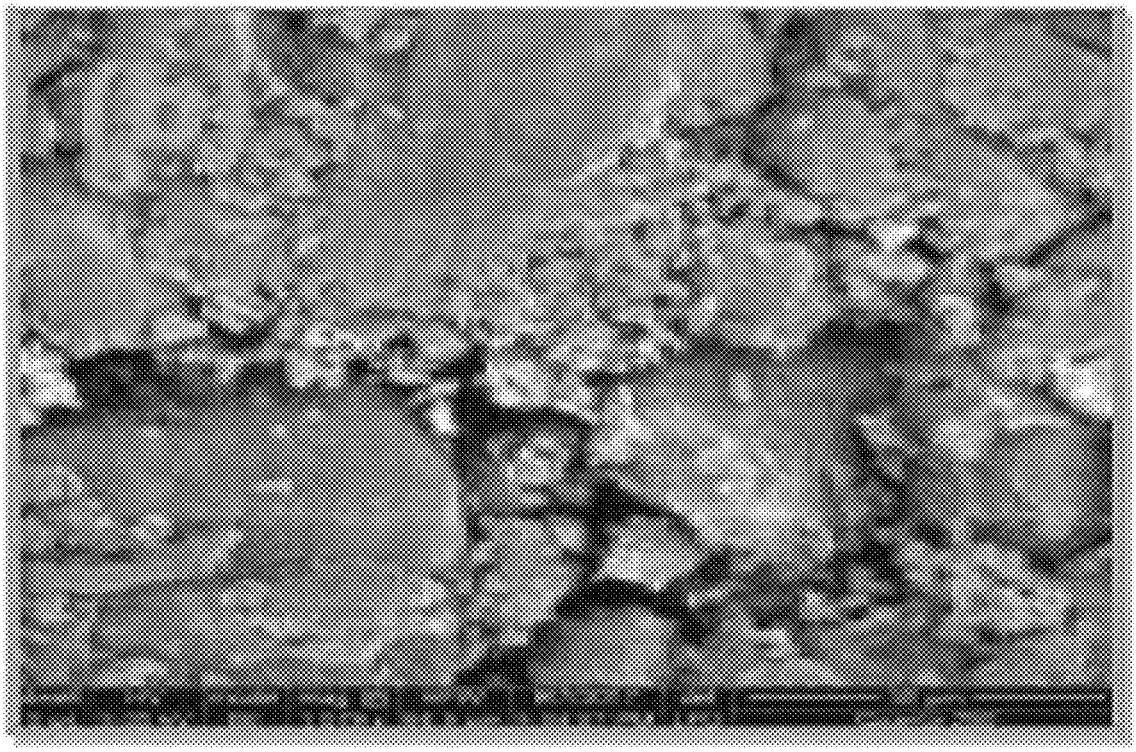
FIG. 5B shows another SEM image of a first attempt at forming the nanocomposite, which involved using toluene as a solvent and autoclaving at 200° C. for 4 h.
Figure 5C:
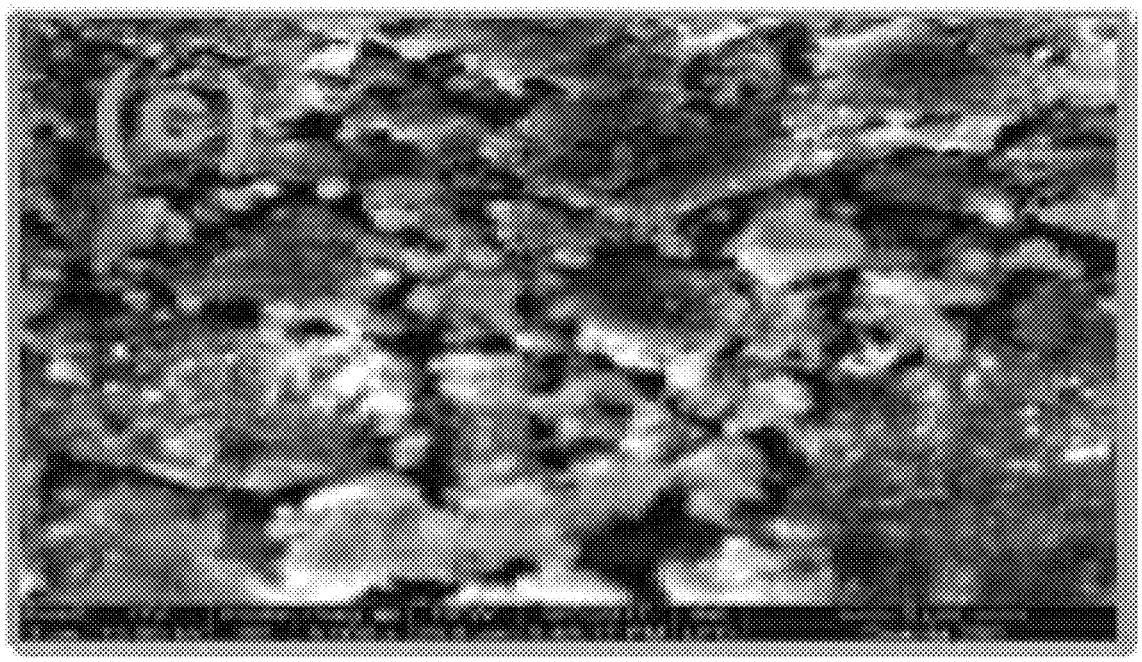
FIG. 5C shows an SEM image of a second attempt at forming the nanocomposite, which involved using toluene as a solvent and autoclaving at 400° C. for 2 h.
Figure 5D:
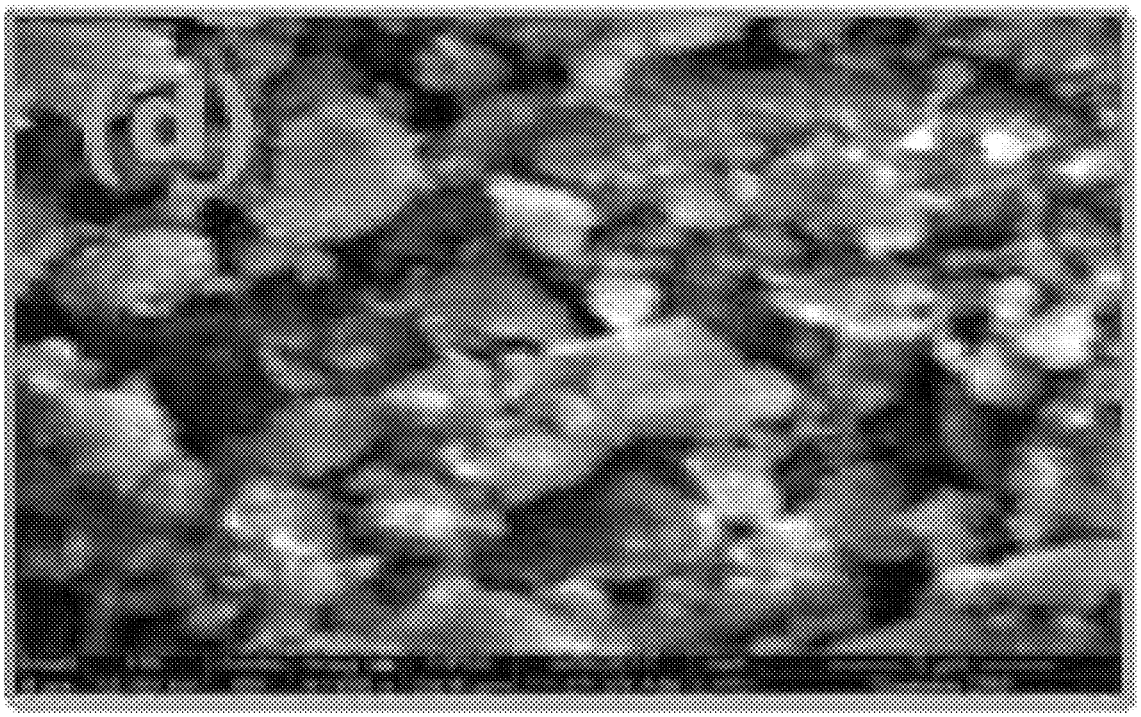
FIG. 5D shows another SEM image of a second attempt at forming the nanocomposite, which involved using benzene as a solvent and autoclaving at 150° C. for 2 h.
Figure 6A:
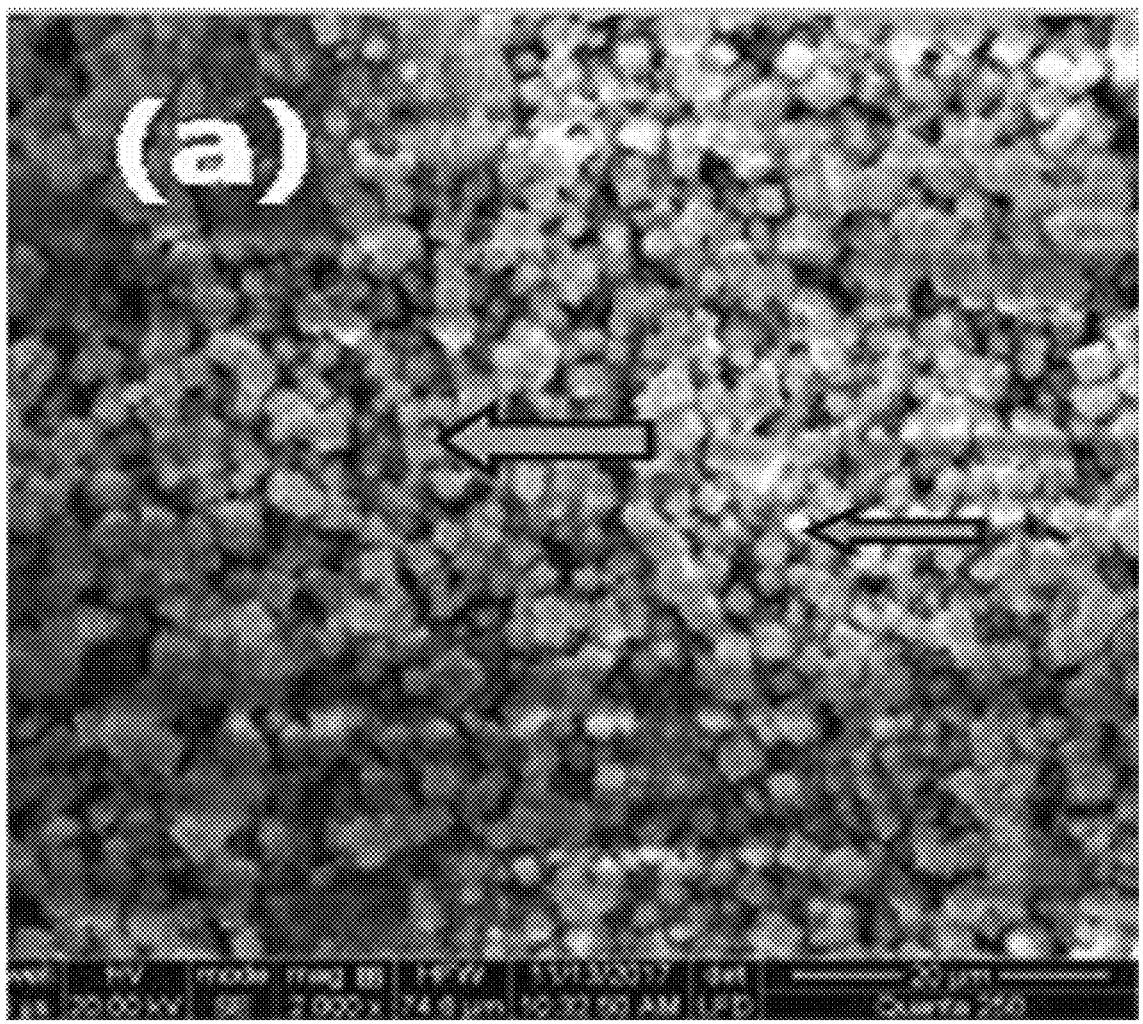
FIG. 6A is an SEM image of the nanocomposite.
Figure 6B:
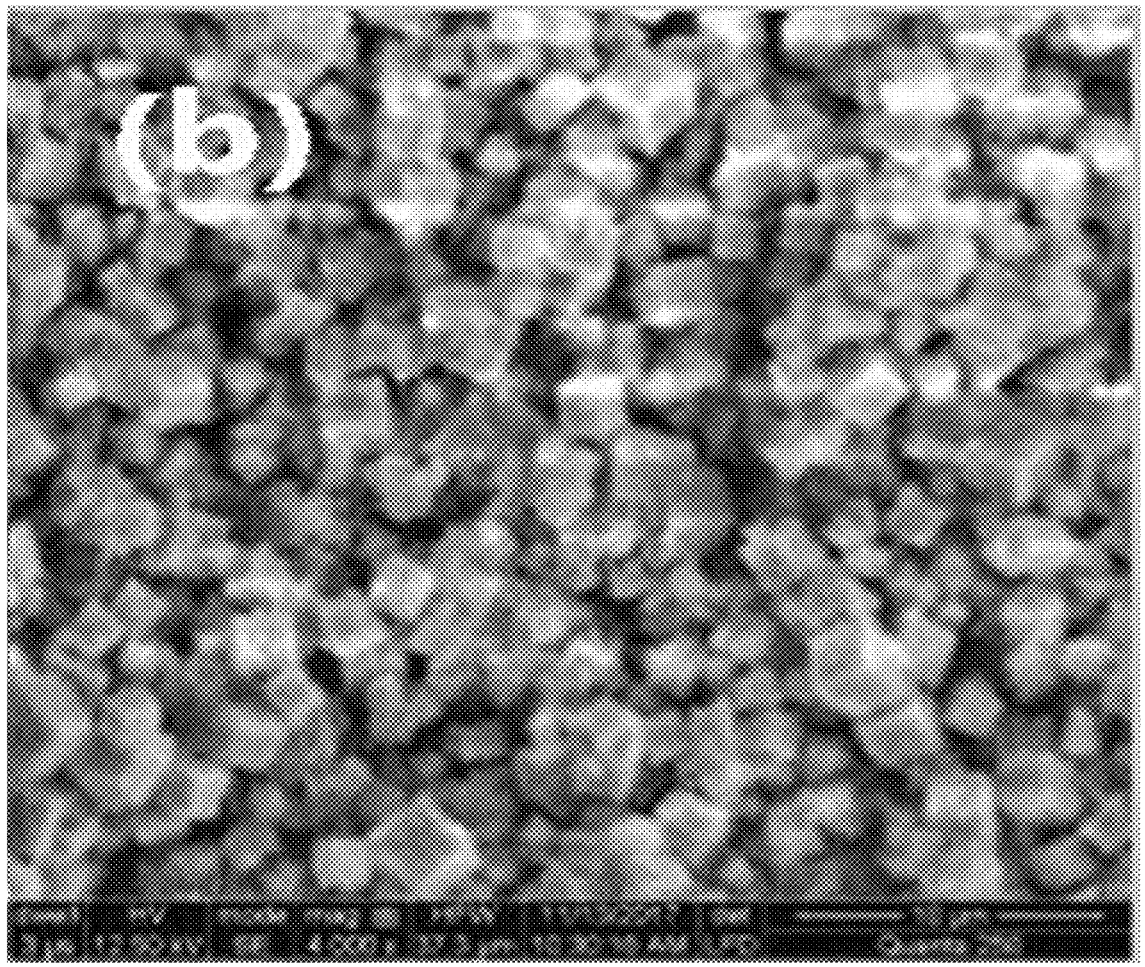
FIG. 6B is another SEM image of the nanocomposite.
Figure 6C:
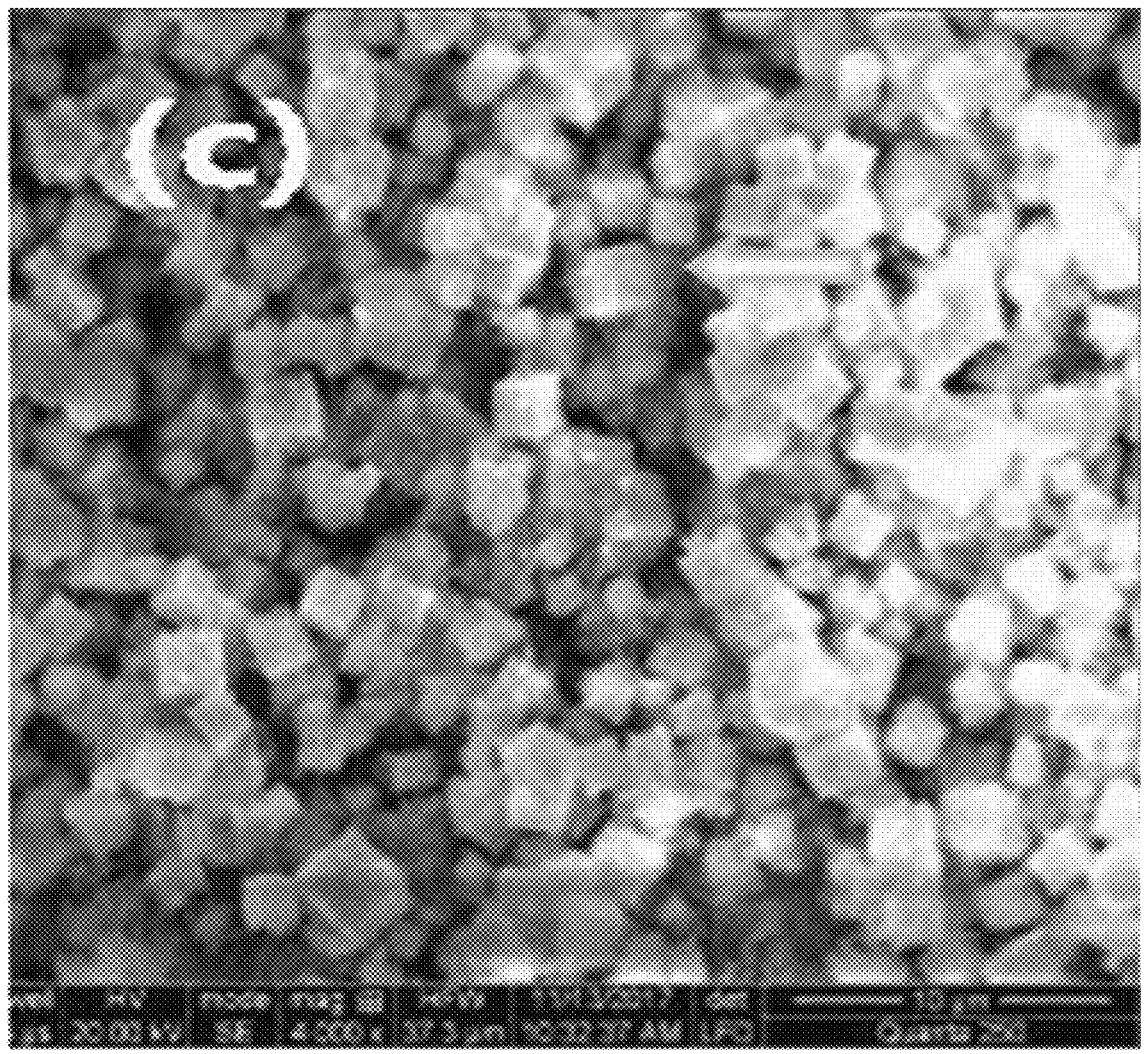
FIG. 6C is another SEM image of the nanocomposite.
Figure 6D:
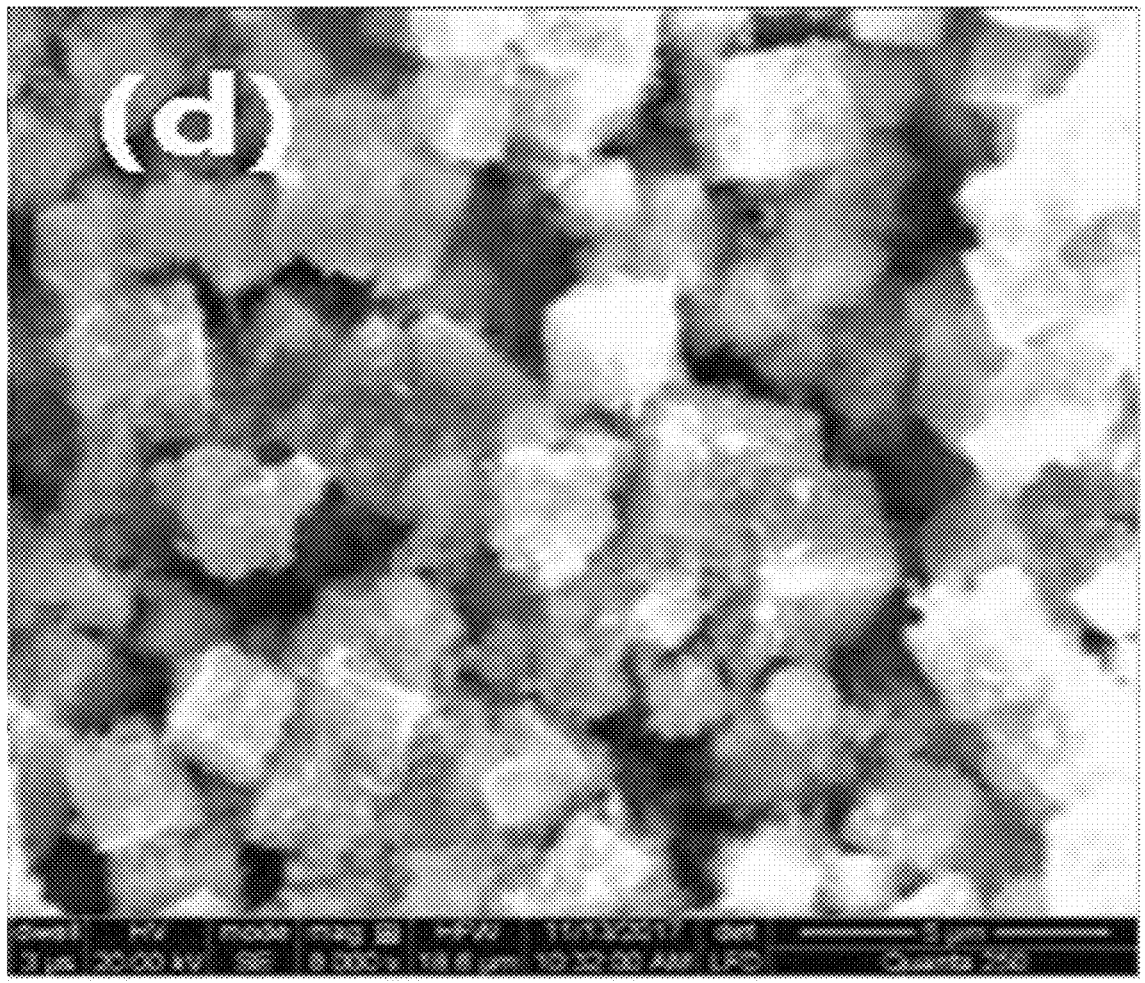
FIG. 6D is another SEM image of the nanocomposite.

In FIGS. 5A and 5B, the 30 micro meter range with 1,600× and 1,579× magnification at a 250 quanta clean surface can be seen. In FIGS. 5C and D, in a 5 micro meter range with a high magnification of 6,000×, small rough nano surfaces can be seen, but no small cubic nanoparticles are seen, which is why with some modifications in the technique, clear and smooth SEM images of the synthesized $C_{16}Co_4O_{16}Sn$ nanocomposite at different magnifications are shown in FIGS. 6A-6D.

Example 7

TEM Analysis of the Nanocomposite

Figure 7A:
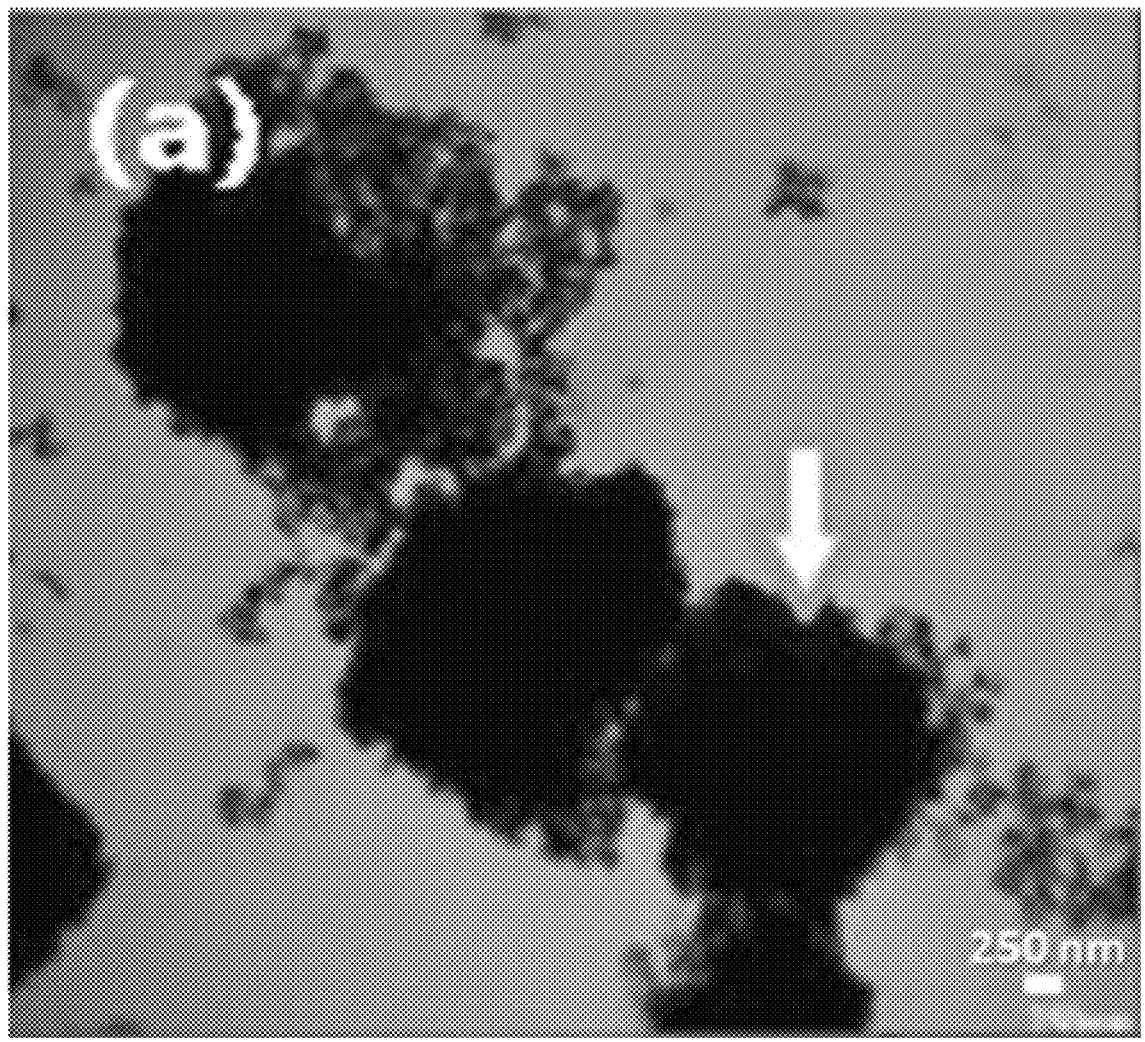
FIG. 7A is a TEM image of the nanocomposite.
Figure 7B:
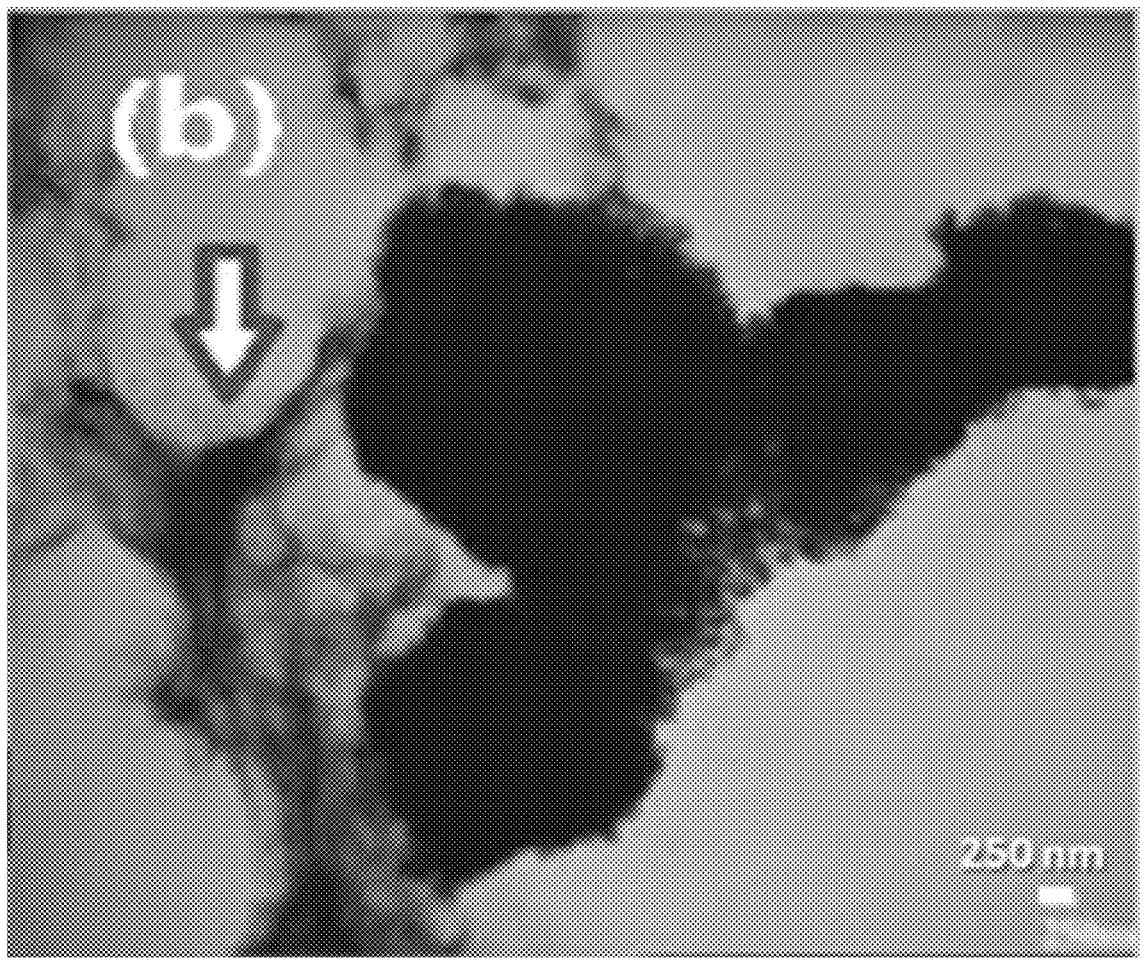
FIG. 7B is another TEM image of the nanocomposite.
Figure 7C:
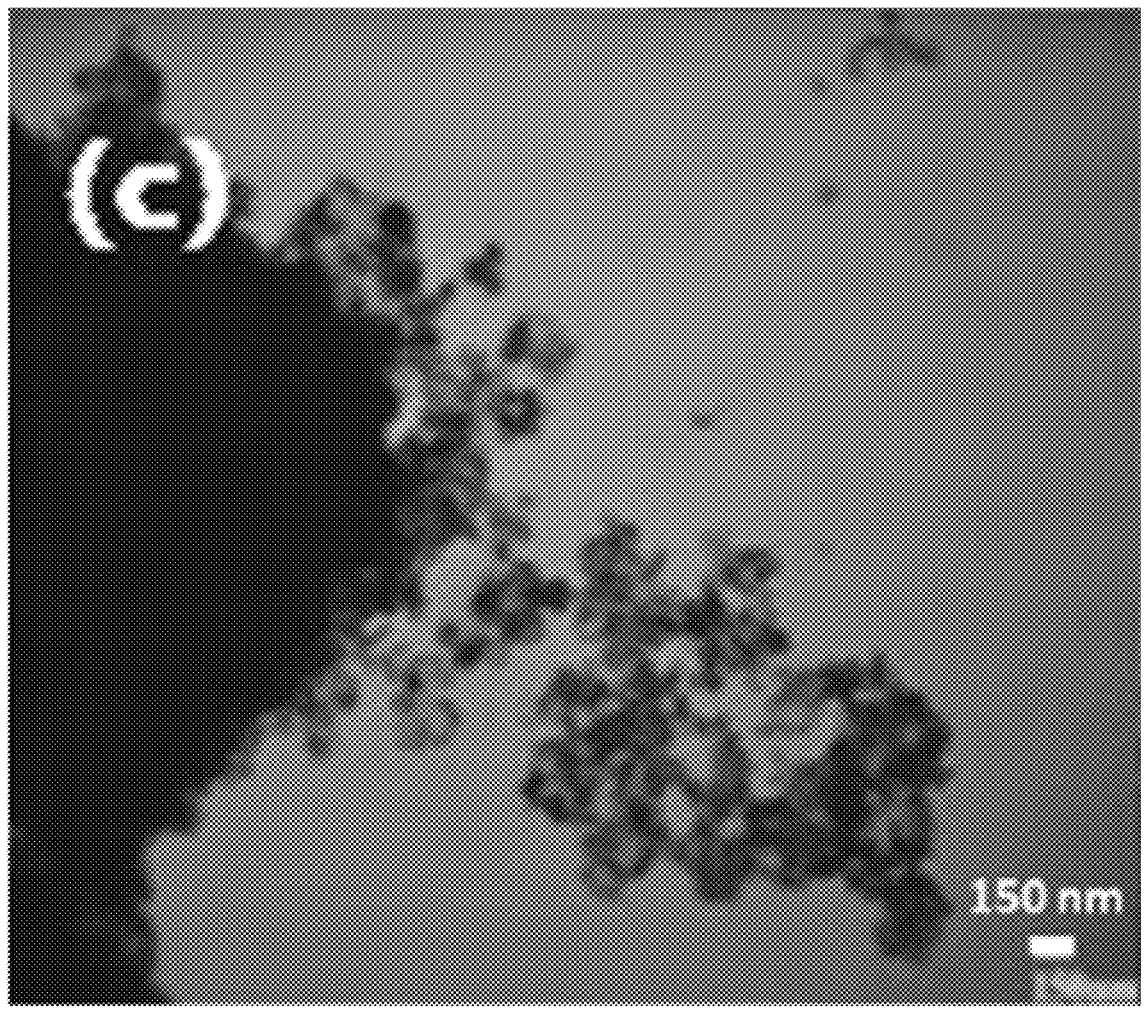
FIG. 7C is another TEM image of the nanocomposite.
Figure 7D:
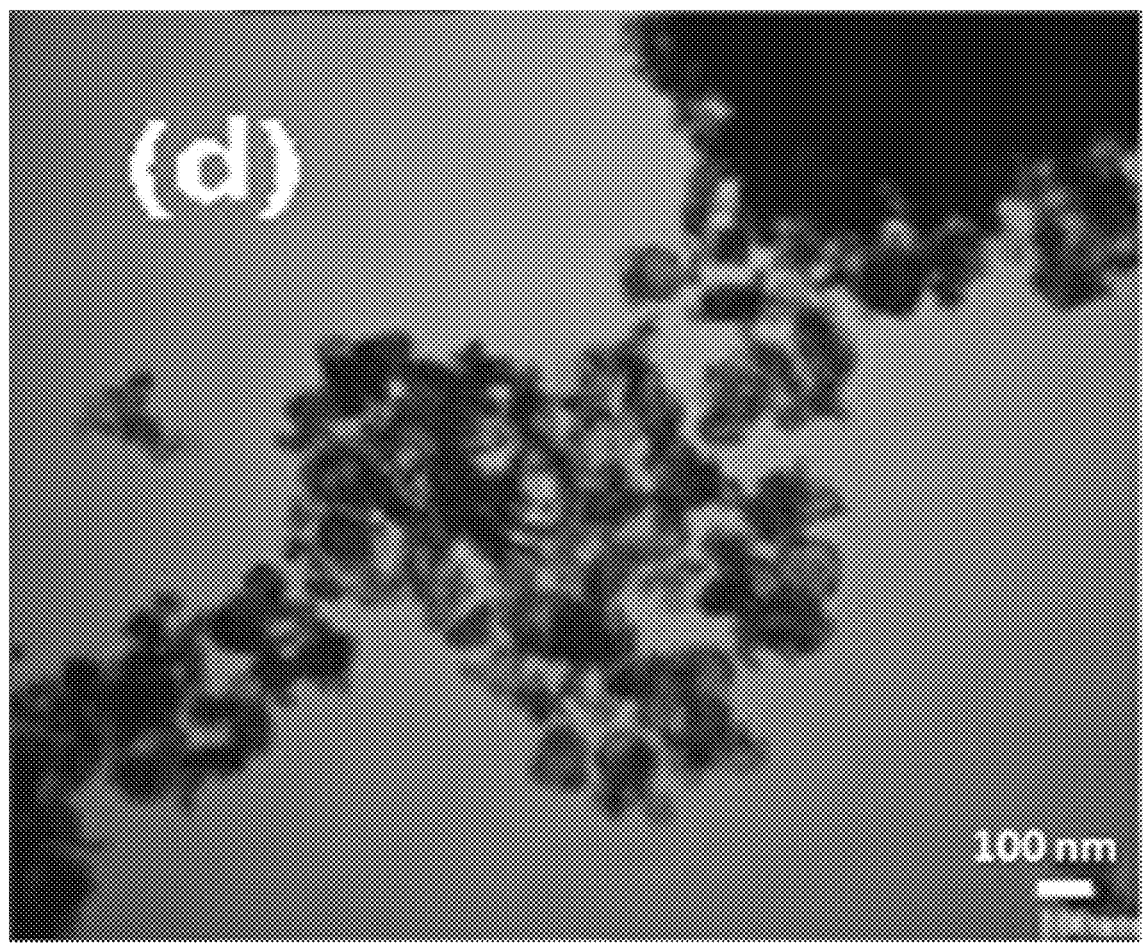
FIG. 7D is another TEM image of the nanocomposite.

To explore the morphology of the newly synthesized GO based bimetallic oxide nanocomposite in more detail at the nanoscale, TEM images at different magnifications are shown in FIGS. 7A-7D. It can be clearly observed from the images of FIG. 7A that, at 250 nm with a magnification of 30k, the nanocomposite is in a cubic shape with soft edges, and the rough corners of the cube are indicated by an orange arrow. The soft edges and rough corners of the cube are due to the product being calcined at 400° C. In FIG. 7B, at 250 nm with a magnification of 30,000×, the surface of RGO can be seen, as indicated by the blue arrow. In FIG. 7C, with a small range of 150 nm, and FIG. 7D with a small range of 100 nm, small nanoparticles can be seen with a magnification power of 30,000× and 40,000×, respectively. In the case of the metal oxide nanoparticles, the cubic particles show pores in their cube. These small pores can reduce the purity and the compatibility of the product and damage the surface area but in the tin cobalt oxide nanocomposite with RGO, the shape of the product is compact but irregular. The TEM images of the product confirm all the previous results of the SEM and XRD.

Example 8

Photocatalytic Applications

Figure 8:
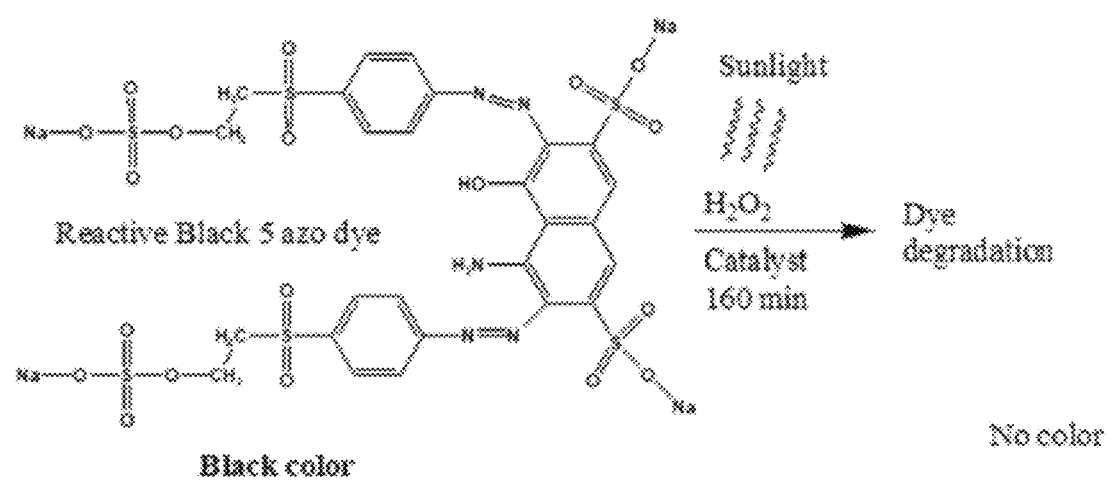
FIG. 8 is a schematic showing the degradation of the dye Reactive Black 5 under sunlight and in the presence of a catalyst and hydrogen peroxide.

Removal of the color of Reactive Black 5 under sunlight and in the presence of the catalyst and hydrogen peroxide is shown in FIG. 8. The reduction of the RB 5 dye in the presence of the catalyst was investigated with the help of a UV-visible spectrophotometer because RB 5 azo dye strongly absorbs at 598 nm. The degradation of the dye was checked in the absence of the nanocomposite, but the maximum absorbance at 598 nm stayed the same with time. This showed that the degradation of the RB 5 dye could not be possible in the absence of the nanocomposite. Thus, the photocatalytic degradation of the dye that was carried out in the presence of an excess amount of hydrogen peroxide and sun irradiation increased the degradation rate, such that the reduction of dye followed pseudo first order kinetics. The addition of hydrogen peroxide enhanced the degradation of the dye because of the additional generation of hydroxyl radicals and prevention of electron-hole pair recombination. See W. Subramonian, T. Y. Wu and S.-P. Chai, Photocatalytic degradation of industrial pulp and paper mill effluent using synthesized magnetic $Fe_2O_3$—$TiO_2$: treatment efficiency and characterizations of reused photocatalyst, J.

Environ. Manage., 2017, 187, 298-310—incorporated herein by reference in its entirety.

Example 9

UV Spectra of the Composite and the Band Gap Calculation

Figure 9A:
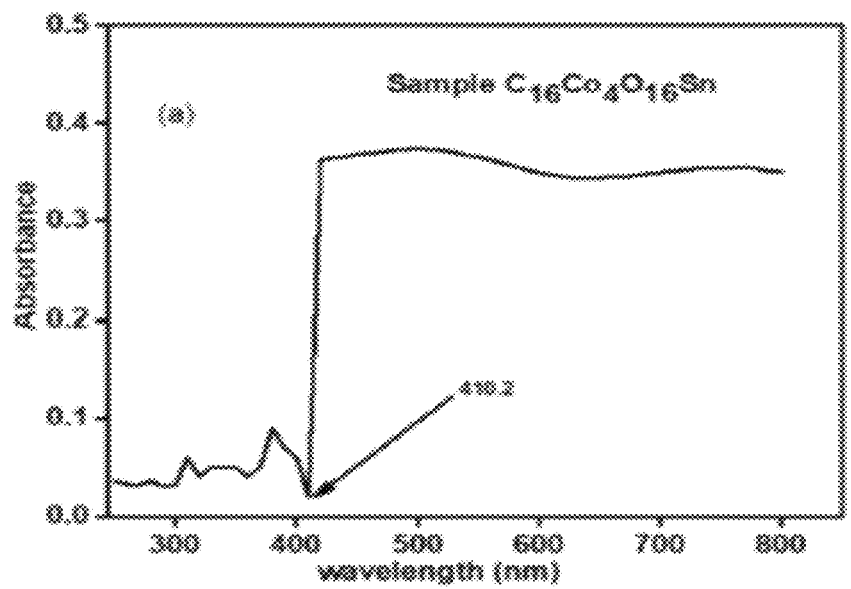
FIG. 9A shows the UV/Visible spectrum of the $C_{16}CO_4O_{16}Sn$ nanocomposite.
Figure 9B:
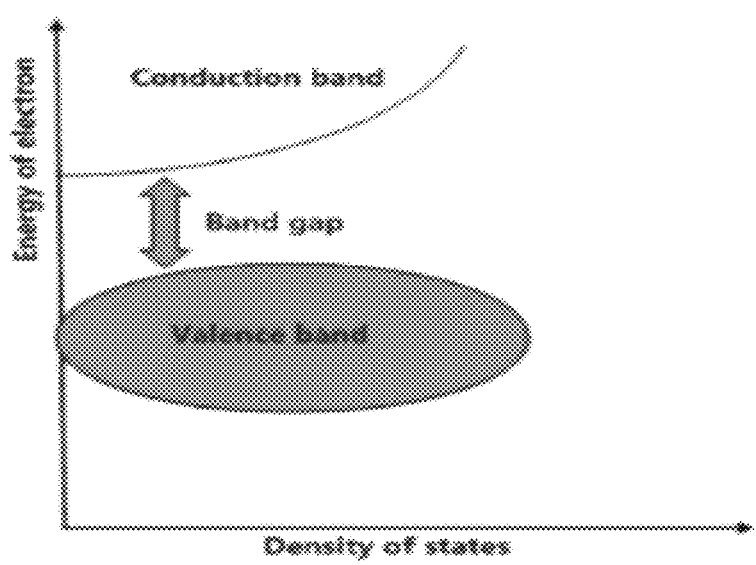
FIG. 9B is a diagram illustrating the bandgap.

The resulting UV spectrum obtained from the $C_{16}Co_4O_{16}Sn$ is shown in FIG. 9A. The recorded spectral data showed a strong cut off at 290 nm with a minimum absorbance that collaborated in the percentage reflectance mode. The term band gap refers to the difference in energy between the conduction band at the bottom and the valence band at the top, and is indicated by a double blue arrow in FIG. 9B. Electrons have the capacity to move up from one band to another. The transition of electrons from the valence band to the conduction band requires minimum packets of energy. It can be seen from FIG. 9B that as the density of states increases, the band gap difference also increases. In the calculation of the band gap, the energy $(E)=hc/\lambda$ where h (Planck's constant)=$6.62\times10^{34}$J s, c (speed of light)=$3.0\times 10^8$ m s$^1$, $\lambda$ (cut-off wavelength)=$4.1882\times10^9$ m, and 1 eV=$1.6\times10^{19}$ J (conversion factor). The band gap is calculated to be $4.7418\times10^{19}$ J or 2.9636 eV.

Example 10

Dye Dependent UV-Vis Spectra

Figure 10:
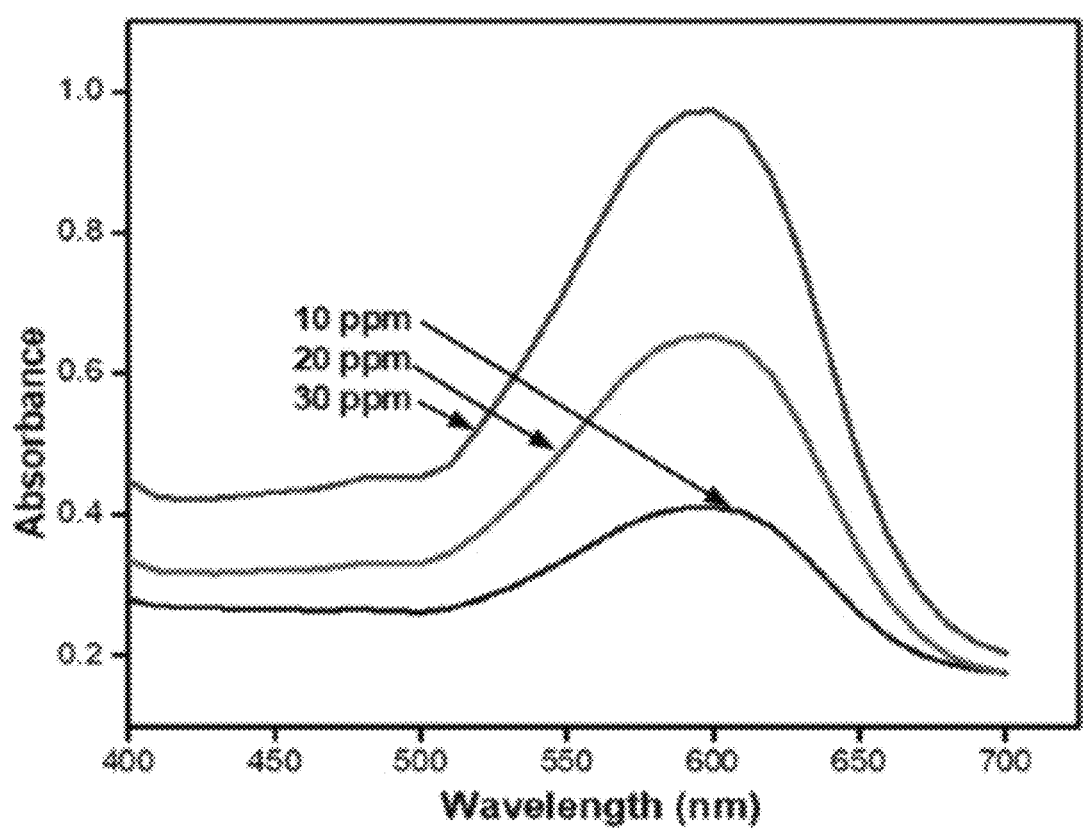
FIG. 10 is dye absorbance spectra at different concentrations of dye solution and at 0.50 mg/mL concentrations of catalyst and 2 mL of hydrogen peroxide.

The dye concentration dependent UV-Vis spectra in the presence of 0.50 mg mL$^{-1}$ of catalyst and 2 mL of hydrogen peroxide is shown in FIG. 10. These dye concentration dependent spectra were taken to study the maximum absorption and intensity of the dye in the absence of a catalyst and hydrogen peroxide. It can be seen in FIG. 10 that at 10 ppm dye solution the maximum absorbance is 0.410, and with 20 ppm dye solution the maximum absorption is 0.653, and similarly at a concentration of 30 ppm dye solution, max absorption is shown at 0.973. All the maximum absorptions were seen at 598 nm. Thus, a dye with a maximum concentration was chosen for further study of different parameters of RB 5 dye degradation.

Example 11

Time Dependent UV-Vis Spectra

Figure 11:
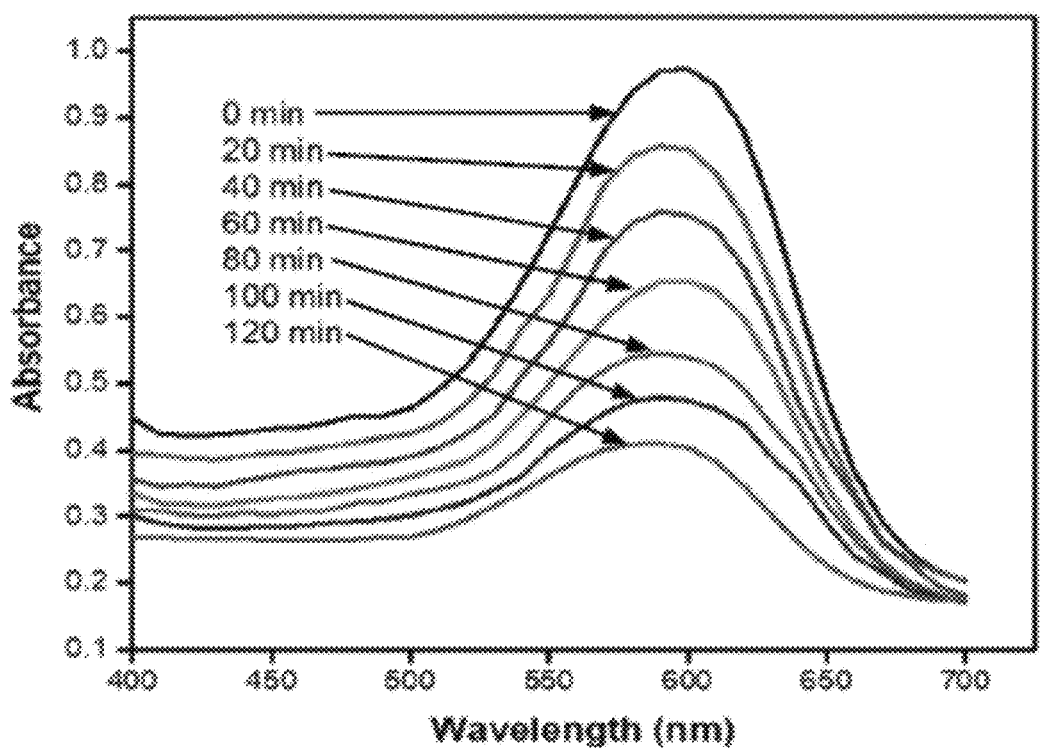
FIG. 11 is UV-Vis spectra of the photocatalytic degradation of the dye at different time intervals under sunlight (conditions: [RB5]=30 ppm, [hydrogen peroxide]=2 mL, and [catalyst]=0.50 mg/mL).

The RB 5 dye degradation time dependent UV-visible spectra in the presence of 0.5 mg mL$^{-1}$ of catalyst and 2 mL of hydrogen peroxide under sun irradiation is shown in FIG. 11. It can be seen that when the process starts, the maximum absorbance at 598 nm is 0.973, but with the passage of time, absorbance at 598 nm decreases to 0.404 after 120 min of stirring under sunlight irradiation. This shows that the dye is degraded, and the nanocomposite has a significant impact on dye degradation.

Example 12

Effect of Catalyst Concentration Variation

Figure 12A:
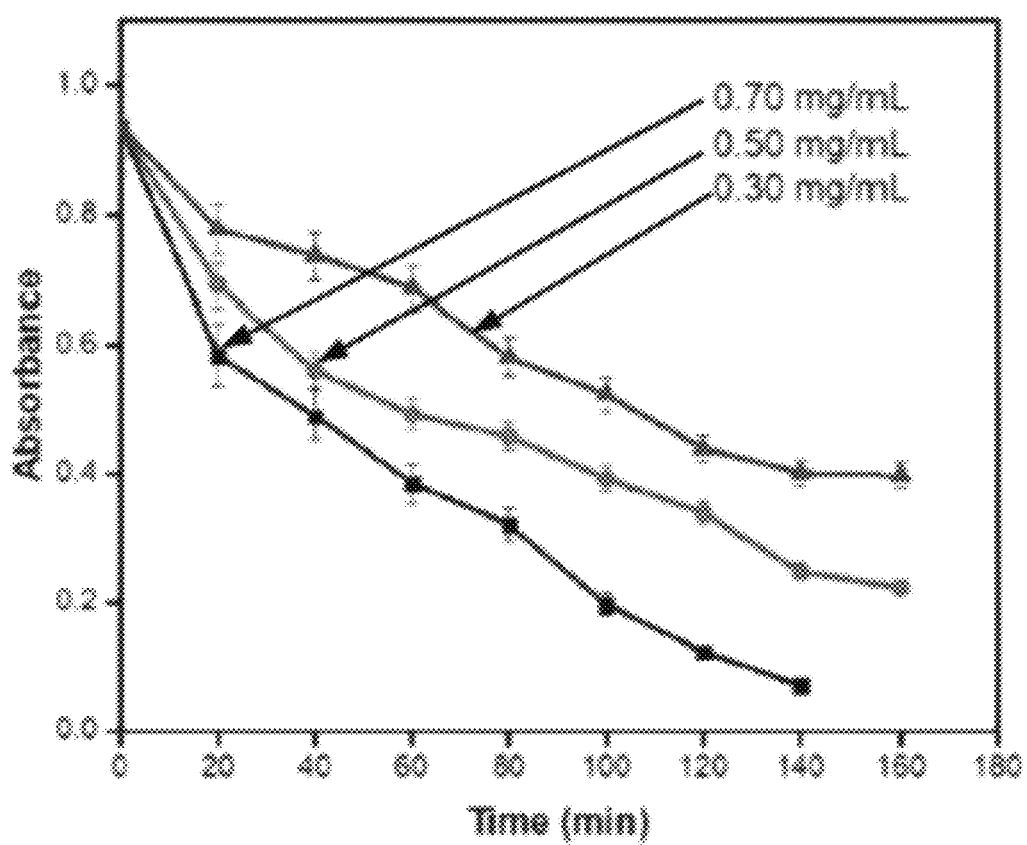
FIG. 12A is a graph of time vs. absorbance for photocatalytic degradation of dye at different dosages of catalyst (conditions: [dye]=30 ppm, [hydrogen peroxide]=2 mL, [catalyst]=0.30, 0.50, and 0.70 mg/mL).
Figure 12B:
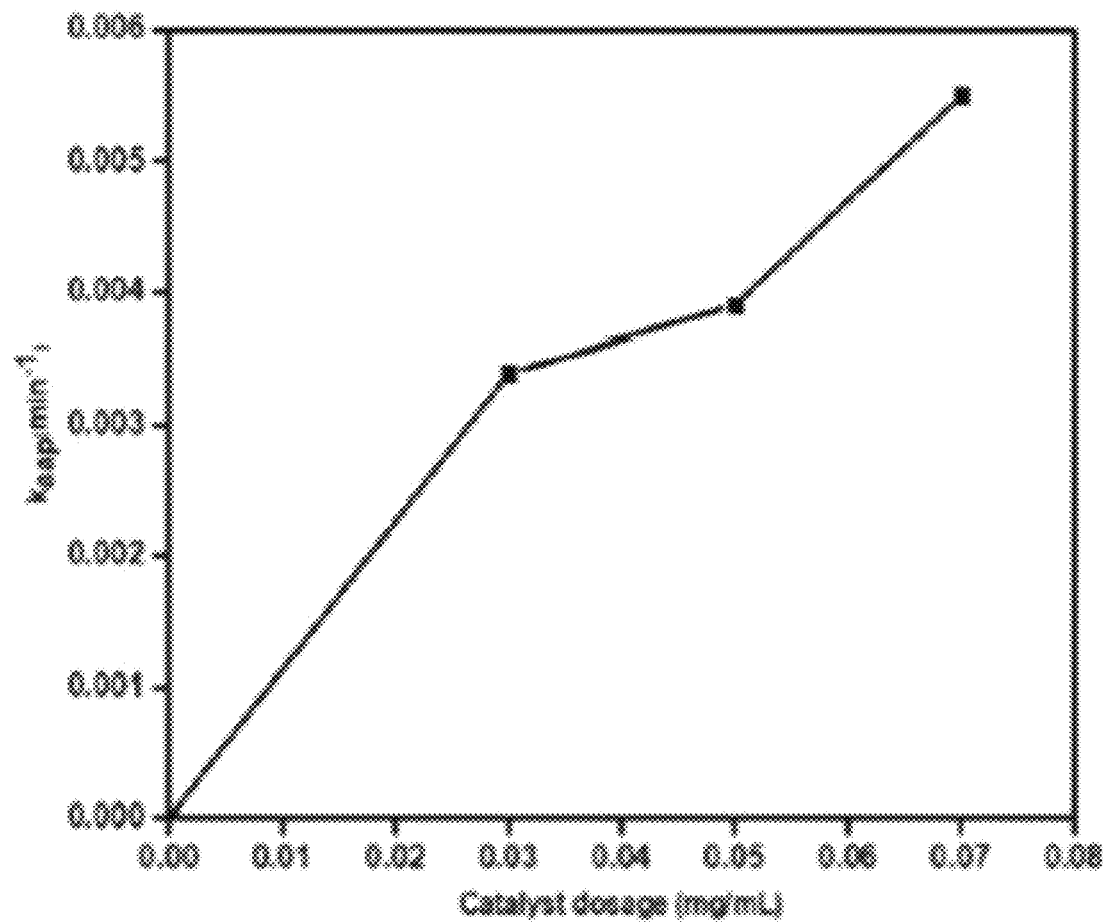
FIG. 12B is a plot of $k_{app}$ vs. different concentrations of catalyst, using the same conditions as described in FIG. 12A.

FIG. 12A shows the graph of the absorbance of dye versus time in the presence of 0.30, 0.50, and 0.70 mg mL$^{-1}$ of catalyst and sunlight. It can be seen in the case of small dosages of catalyst that initially the change in value of absorbance with the passage of time is very small but as the dosage of catalyst increases, the rate of degradation is also increased. As the time passes, the process of dye degradation is increased and with the highest ratio of catalyst dosage i.e., 0.70 mg mL$^{-1}$. At this dosage of catalyst the dye degraded with a quick time interval of 140 min and in the case of the other two dosages, the dye takes 160 min to degrade, which shows how the dosage of catalyst is important for the degradation of the RB 5 azo dye. In the case of 0.50 and 0.30 mg mL$^{-1}$ catalyst dosage, a rapid decrease in the value of absorbance with time is firstly observed and then this decrease in absorbance becomes slow as compared to the case of 0.70 mg mL$^{-1}$ catalyst dosage. The data from FIG. 12A is used to find the value of $k_{app}$. The plot of the catalyst dosage and $k_{aap}$ is shown in FIG. 12B. The value of $k_{aap}$ increases from 0.003 to 0.059 mg mL$^{-1}$ by increasing the concentration of the catalyst from 0.30 to 0.50 mg mL$^{-1}$. This increase in the value of $k_{app}$ is because of the increase in the number of available active sites with an increasing concentration of catalyst. This shows that at a low dosage of catalyst, the speed of catalysis is slow. In all the dye degradation processes where the dosage of catalyst varies with time, the other two parameters (dye concentration and hydrogen peroxide concentration) were constant.

Example 13

Effect of Hydrogen Peroxide without a Catalyst

Figure 13:
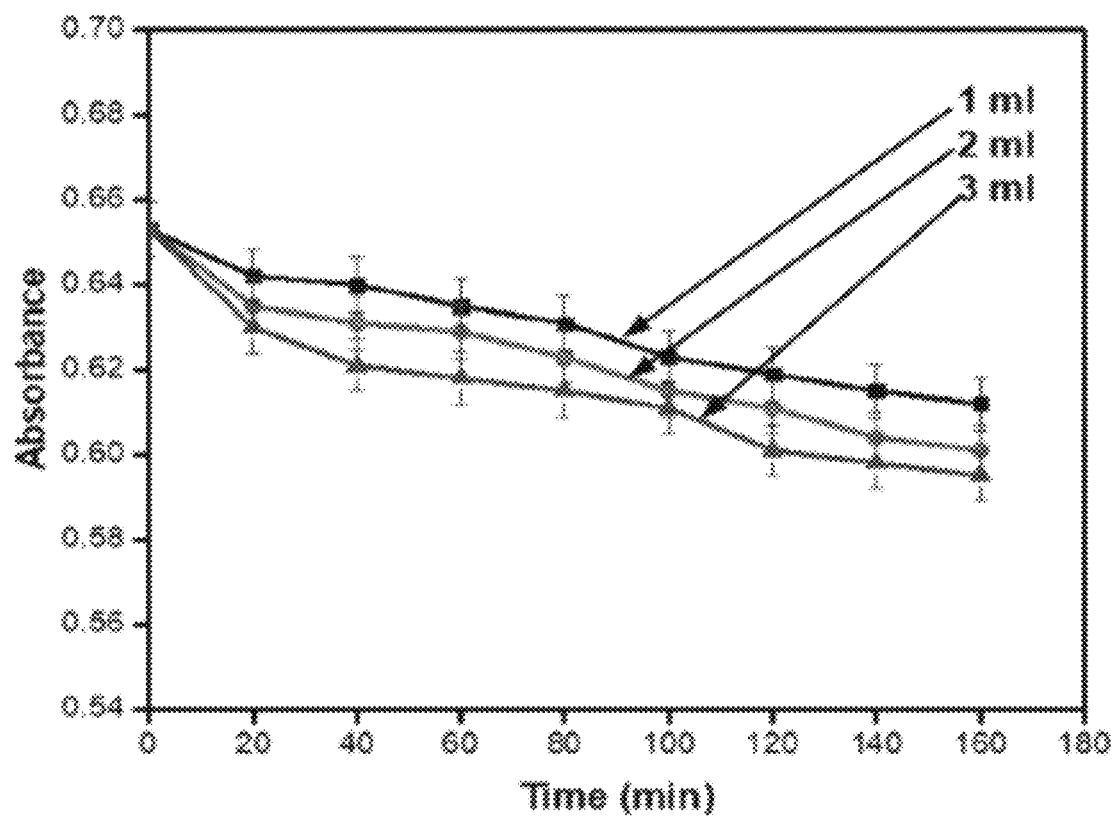
FIG. 13 shows the time versus absorbance for the photocatalytic degradation of dye at different dosages of hydrogen peroxide (conditions: [RB5]=20 ppm, [hydrogen peroxide]=1, 2, and 3 mL), and without catalyst.

The graph of absorbance versus time for 1, 2 and 3 mL concentrations of hydrogen peroxide in the absence of a catalyst is shown in FIG. 13. In this graph, minor changes with fluctuating values of dye absorbance can be seen. At 20 ppm concentration, the dye shows the lowest absorbance of 0.595 with 3 mL of hydrogen peroxide amount and in the absence of a catalyst. This shows that the catalyst has a huge impact on the photocatalytic degradation.

Example 14

Effect of Hydrogen Peroxide Concentration in the Presence of a Catalyst

Figure 14A:
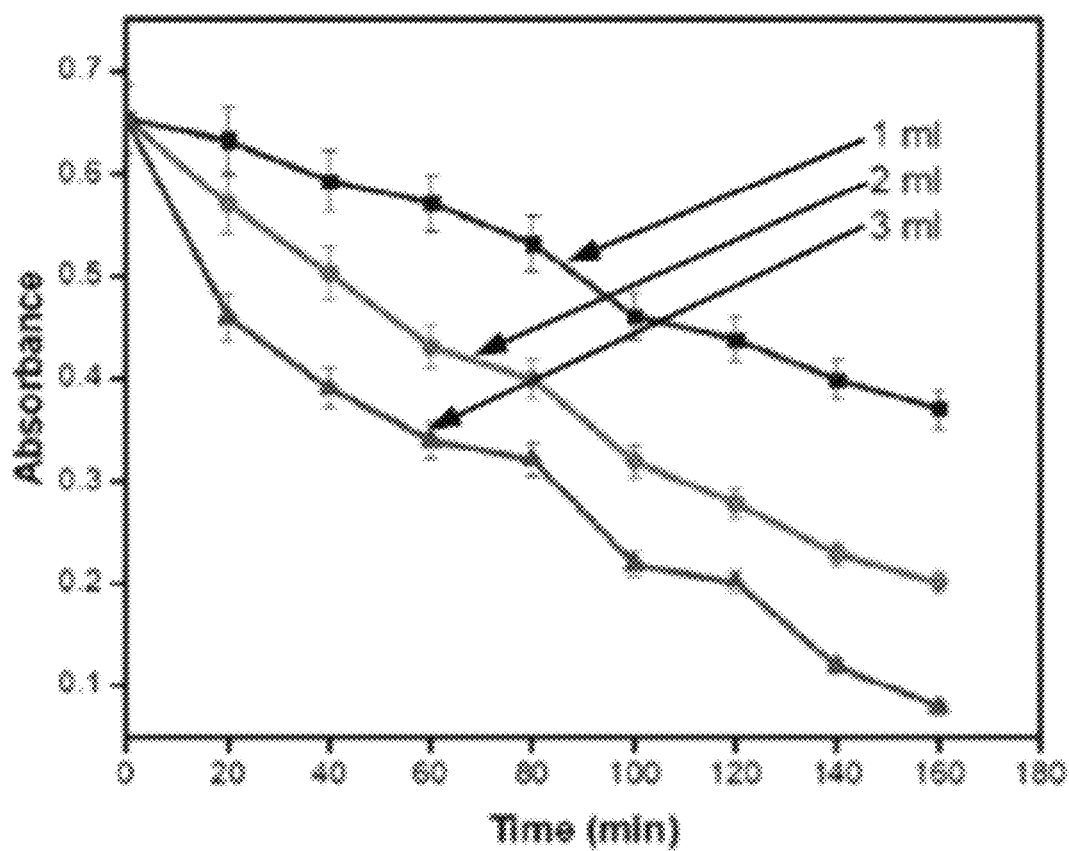
FIG. 14A shows the time versus absorbance for photocatalytic degradation of the dye at different dosages of hydrogen peroxide (conditions: [dye]=30 ppm, [hydrogen peroxide]=1, 2, and 3 mL, and [catalyst]=0.50 mg/mL).
Figure 14B:
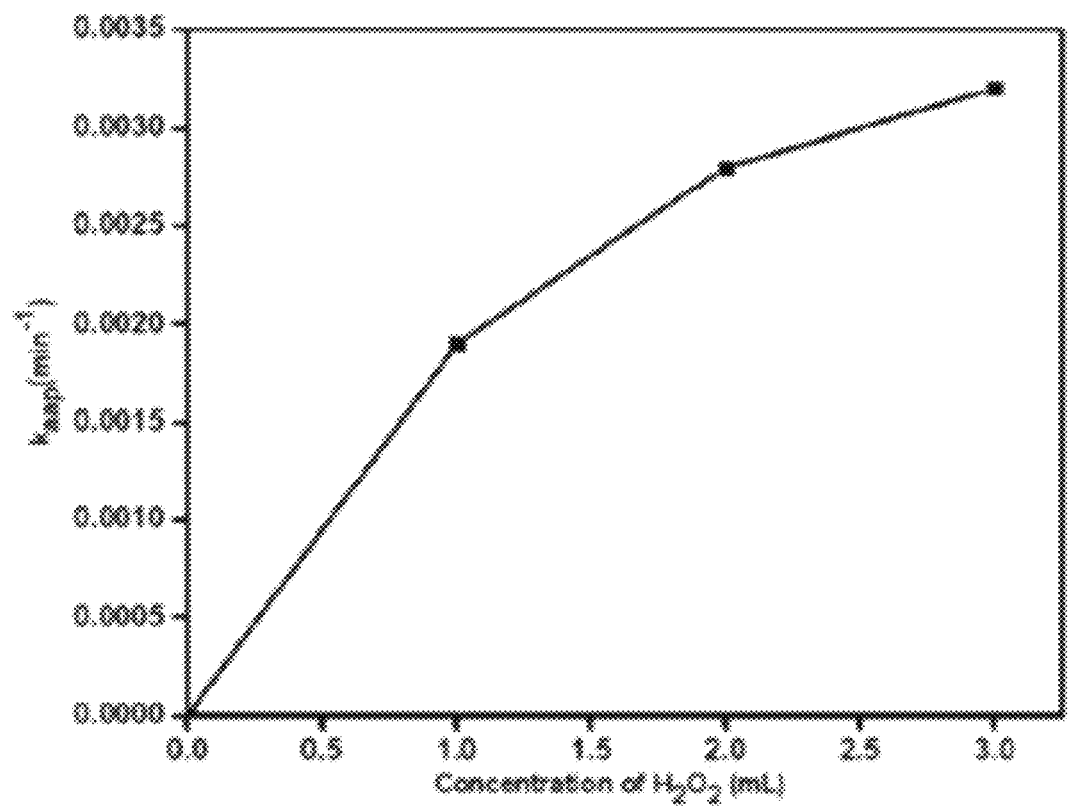
FIG. 14B is a plot of $k_{app}$ vs. the concentrations of hydrogen peroxide used in FIG. 14A and at the same conditions.

The graph of absorbance versus time for 1, 2 and 3 mL concentration of hydrogen peroxide is shown in FIG. 14. The graph in FIG. 12 is like that of FIG. 14. In this plot, initially the absorbance does not decrease with time in the case of 1 mL of hydrogen peroxide concentration. However, in the case of a 2 mL concentration of hydrogen peroxide, the absorbance decreases throughout the time period and decreases until the start of the decolorization. However, as the amount of hydrogen peroxide increases to 3 mL, a sharp decrease in the absorbance can be seen and then in a short period of time the absorbance decreases slowly but at 80 min a sharp decrease can be seen and then a continuous decrease in absorbance is observed for 160 min. The maximum decrease in absorbance can be seen in 3 mL of hydrogen peroxide at a 160 min time interval, which is 0.079. After 160 min, the photocatalytic dye degradation process stops and the dye solution shows almost the same absorbance as the full degradation of dye within 2 hours. In all the dye degradation processes where the hydrogen peroxide concentration varies, the other two parameters (dye concentration and catalyst dosage) are constant. The data from FIG. 14A is used to find the value of $k_{aap}$. The plot of catalyst dosage and $k_{aap}$ is shown in FIG. 14B. The value of $k_{aap}$ is increased from 0.0019 to 0.0032 mg mL$^{-1}$ by increasing the amount of hydrogen peroxide from 1 to 3 mL. This increase in the value of $k_{aap}$ is because of the increase in the number of available active sites with increasing the concentration of catalyst.

Example 15

Mechanism of Dye Degradation

Nano level semiconductors have a higher volume to surface area ratio than their bulk counterparts, which therefore allows a higher absorption of photons in the presence of a photocatalytic surface. Furthermore, recombining of e⁻ and hole pairs in the semiconductor nanoparticles is reduced when particle size is smaller. When the size of particles in the semiconductor is reduced to the nanometer level, the energy band gap greatly increases, which leads to huge redox potentials in the whole system. Therefore, bulk scale semiconductors are expected to lower photocatalytic activity while nanoscale semiconductors have a high photocatalytic activity. See M. Sharma, et al., Photocatalytic degradation of organic dyes under UV-visible light using capped ZnS nanoparticles, *Sol. Energy,* 2012, 86(1), 626-633—incorporated herein by reference in its entirety. Commonly, to improve the efficiency of a catalyst, the number of electrons is reduced, and the charge rate is enhanced so the recombination of holes and electrons is very important. It is known that semiconductor photocatalyzed reactions are started by holes or electrons being generated in the valence band or conduction band by semiconductor nanoparticles. See G. Zhou and J. Deng, Preparation and photocatalytic performance of Ag/ZnO nano-composites, *Mater. Sci. Semicond. Process.,* 2007, 10(2-3), 90-96—incorporated herein by reference in its entirety. After adding the catalyst into the solution, light is absorbed in the form of energy according to the band gaps. Positive holes in the valence band are formed due to the transfer of electrons from the valence band to conduction band.

$$\text{Semiconductor} + \text{UV light} \rightarrow h^+ + e^-$$

Figure 15:
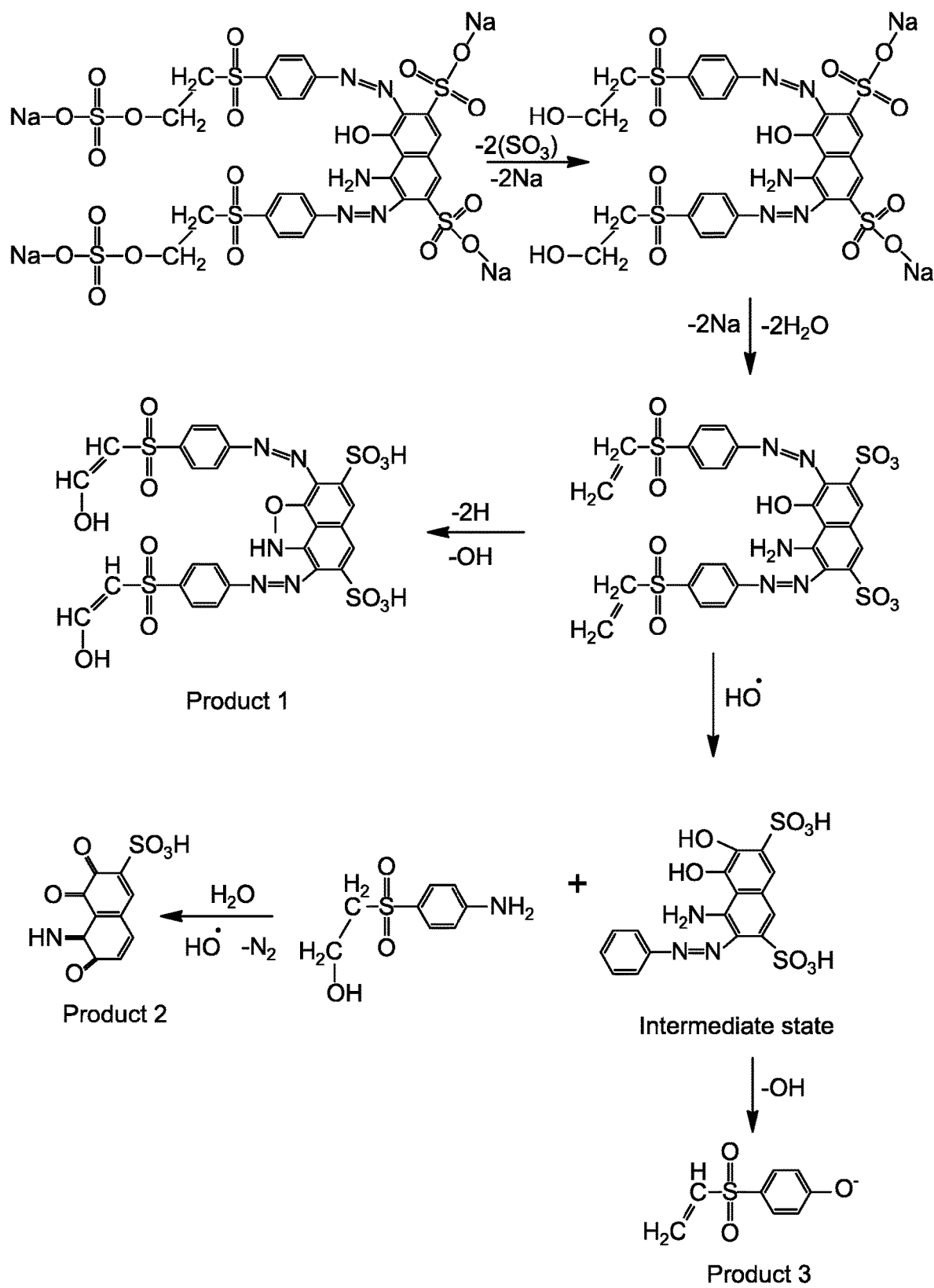
FIG. 15 shows proposed degradation routes for the photocatalytic oxidation of the Reactive Black 5 dye.

An electron hole pair has a lifetime of only a few seconds, but it is still enough to start a redox reaction with the semiconductor nanoparticles in the solution. There are three possible reaction pathways which have been proposed in the photochemical reaction (FIG. 15).

(1) An hydroxyl radical (OH) is oxidized by water and a positive hole which further oxidizes the dye molecules.

(2) A super oxide anion is formed when dissolved oxygen is reduced by an electron, and this anion will start the mineralization of the RB5 dye. This super oxide radical again reduces to hydrogen peroxide.

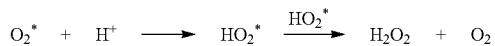

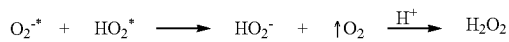

Cleavage of $H_2O_2$:

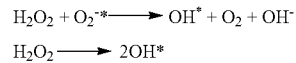

(3) A hydroxyl radical (OH) is produced by water molecules by a positive hole, which causes in turn the oxidization of the dye molecules.

For the confirmation of this mechanism, the presence of hydrogen peroxide for degradation of the RB5 azo dye in the presence of sunlight was investigated. For this reason, KMnO₄ was added into the solution as a titrant. When it was added into the solution, the purple color was diminished, and hydrogen peroxide was produced consistently throughout the photocatalytic decomposition of the RB5 dye in which the permanganate ion acts as an oxidizing agent and causes the oxidation of hydrogen peroxide. The permanganate ion was reduced from a +7 oxidation state (purple color) to a +2 oxidation state in Mn with no color. See A. N. Rao, B. Sivasankar, and V. Sadasivam, *Photo-oxidative degradation of an azo dye direct red 31 in the presence of ZnS catalyst,* 2010 Search PubMed; and E. K. Goharshadi, et al., Photocatalytic degradation of reactive black 5 azo dye by zinc sulfide quantum dots prepared by a sonochemical method, *Mater. Sci. Semicond. Process.,* 2013, 16(4), 1109-1116—incorporated herein by reference in its entirety.

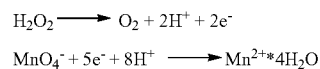

Example 16

$C_{16}Co_4O_{16}Sn$ Nanoparticles as a Catalyst for Fuel Efficiency

Low octane kerosene oil was used in the presence of the synthesized nanocomposite as a reference for investigating the efficiency of this fuel and to study the properties of modified kerosene oil because kerosene oil is commonly used in heavy jet engines and aircraft. The efficiency of the fuel was monitored by examining all the parameters at different concentrations of fuel in the presence of the newly synthesized nanocomposite. The fire point, flash point, cloud point, pour point, and calorific values were observed to examine the burning properties of pure kerosene oil as a model reaction. To analyze the physical characteristics of kerosene oil, the specific gravity was calculated.

Example 17

Effect of the $C_{16}Co_4O_{16}Sn$ Nanocomposite on the Efficiency of Kerosene Oil The effect of the synthesized nanocomposite on the efficiency of kerosene oil was investigated by different parameters such as fire point, flash point and specific gravity. These parameters were studied at various dosages of catalyst (0, 30, 60 and 90 mg mL⁻¹). All the results secured by using various dosages of catalyst were compared with reference to pure kerosene oil.

Example 18

Flash Point and Fire Point

Figure 16:
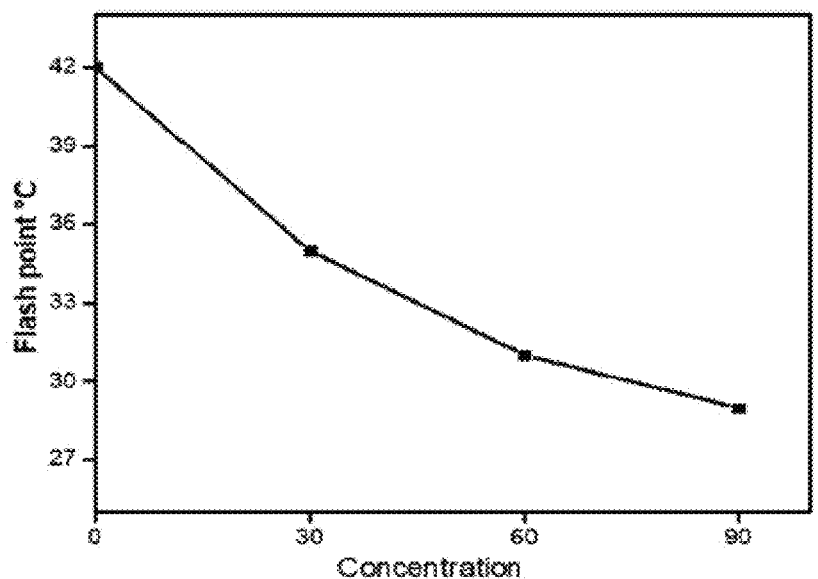
FIG. 16 shows the effect of the $C_{16}Co_4O_{16}Sn$ nanocomposite on the flash point of pure kerosene oil.
Figure 17:
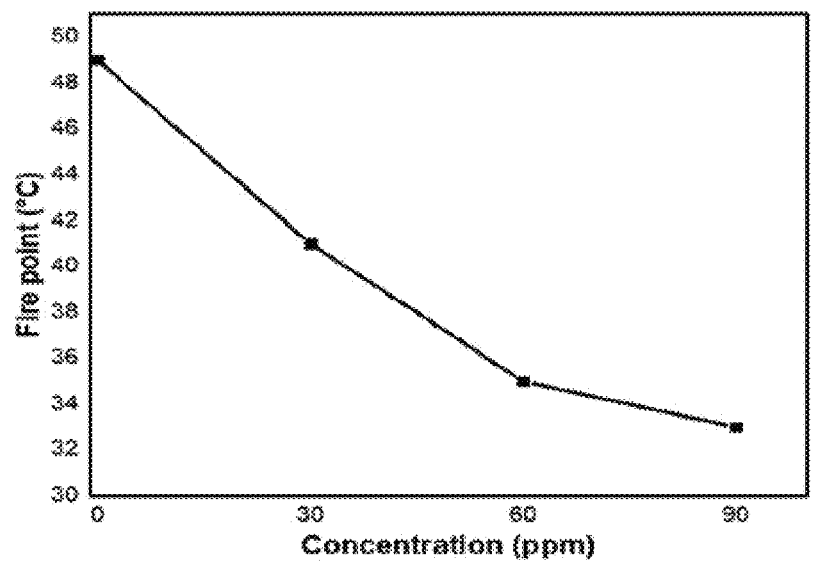
FIG. 17 shows the effect of the $C_{16}Co_4O_{16}Sn$ nanocomposite towards the fire point of pure kerosene oil.

The effects of flash point and fire point on the efficiency of pure kerosene oil at different concentrations of nanocomposite (0, 30, 60 and 90 ppm) are shown in FIGS. 16 and 17.

It can be clearly seen from the plots that without the nanocomposite, the flash point and fire point temperature of pure kerosene oil is high. But after some time, as the concentration of nanocatalyst increases, the flash and fire point temperature significantly decreases. The decreasing plot shows the continuous decrease in the flash and fire point temperature. This decreasing pattern of the flash and fire point temperatures shows that the newly synthesized nanocomposite has the best characteristics as a catalyst to increase the efficiency of pure kerosene oil.

From Table 3, it can be clearly seen that the temperature of the flash and fire point of pure kerosene oil was high in the absence of the nanocatalyst. These values sharply decrease initially but by increasing the concentration of nanoparticles these values gradually decrease until the end of the 90 ppm concentration of kerosene oil. The temperature difference between the flash and fire points of pure kerosene oil was 7° C. and after adding the nanocatalyst, initially it changed to 6° C. and ended with 5° C. This difference in temperature indicates that the new nanocomposite plays a vital role as a catalyst to increase the efficiency of pure kerosene oil by varying the dosage of the catalyst at commercial as well as for analytical scale.

TABLE 3

Effect of the nanocomposite on the various parameter and different concentrations of kerosene oil

| Parameters | Concentration of catalyst dosage | | | |
|---|---|---|---|---|
| | (Pure kerosene oil) | 30 ppm | 60 ppm | 90 ppm |
| Flash point | 42° C. | 35° C. | 31° C. | 29° C. |
| Fire point | 49° C. | 41° C. | 35° C. | 33° C. |
| Specific gravity | 0.7853 g cm$^{-3}$ | 0.7878 g cm$^{-3}$ | 0.7880 g cm$^{-3}$ | 0.7884 g cm$^{-3}$ |
| Cloud point | 9° C. | 6° C. | 5° C. | 3° C. |
| Pour point | -15° C. | -19° C. | -22° C. | -30° C. |
| Calorific values | 920 J g$^{-1}$ | 12 604 J g$^{-1}$ | 20 819 J g$^{-1}$ | 31412 J g$^{-1}$ |

Example 19

Specific Gravity

The specific gravity of pure kerosene oil was examined by a specific gravity meter (DA640) with 10 seconds of pump timing for each sample of the $C_{16}CO_4O_{16}Sn$ nanocatalyst at 25° C. being used to check the effect of the specific gravity on pure kerosene oil.

Figure 18:
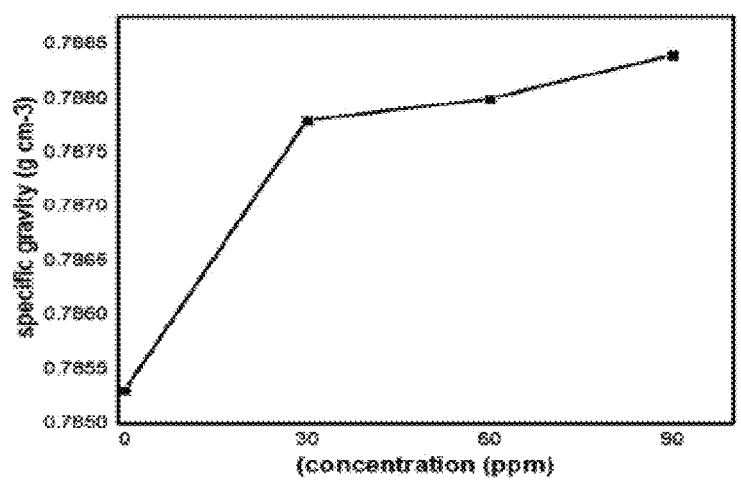
FIG. 18 shows the effect of the $C_{16}Co_4O_{16}Sn$ nanoparticles on the specific gravity of kerosene oil.

Firstly, the specific gravity of kerosene oil in the absence of the nanocatalyst at 20° C. was measured, which gave low values of specific gravity: 0.7853 g cm$^{-3}$. When the nanocatalyst at 30 ppm concentration was added into the pure kerosene oil it showed some increasing behavior i.e. the specific gravity of the pure kerosene oil increased to 0.7878 g cm$^{-3}$ and was continuously increased by enhancing the concentration of the nanocatalyst. A higher concentration of nanoparticles dosage (90 ppm) shows the high values of specific gravity. The high specific gravity of kerosene oil was due to the high surface area of the newly synthesized nanoparticles. The effect of the nanoparticles on the specific gravity of the fuel is shown in FIG. 18. By running the sample on (SGM) three times, the results show that the specific gravity value of pure kerosene oil is low as compared to the modified kerosene oil. At different concentrations, the specific gravity values shift, but they are lower than the pure sample.

Example 20

Pour Point and Cloud Point

The pour point and cloud point values of pure kerosene oil were high in the absence of the nanocatalyst. The values of cloud point at the start decreased by the addition of nanoparticles. With a high dosage of the catalyst, the cloud point values of the pure kerosene oil initially decreased by 1° C. per 30 ppm and ended with 3° C. per 30 ppm approximately. In the case of the pour point, the temperature in the presence of three different concentrations of the nanocatalyst in pure kerosene oil was found to be in the range of −15 to −33° C. The pour point temperature constantly decreased by 1° C. for each concentration of kerosene oil by increasing the amount of $C_{16}Co_4O_{16}Sn$ nanoparticles up to 90 ppm. These values show that the pour point temperature is not affected by adding different dosages of nanocatalyst.

Example 21

Calorimetric Values

In the presence of three different dosages of the concentration of $C_{16}Co_4O_{16}Sn$ nanoparticles (30, 60, and 90 ppm), the calorific values of pure kerosene oil are given in Table 3. It can be clearly seen from the given table that pure kerosene oil in the absence of a catalyst shows a low calorific value. After adding a catalyst of three different concentrations, the kerosene oil shows constantly high calorific values by adding a high concentration dosage of nanoparticles.

Example 22

Summary

A composite of cobalt tin oxide nanoparticles with RGO was successfully synthesized by a solvothermal approach. The newly synthesized nanocomposite was characterized by UV-visible spectroscopic analysis, EDX, XRD, SEM, TEM, and X-ray diffraction (XRD). The investigation report confirms that the product is pure and the cobalt tin oxide nanoparticles are adsorbed over the surface of RGO. Controlled morphological experiments show that in the product, the nanocomposites, are completely separate from each other and the sizes of the nanocomposite are in the nano range. The wavelength of the maximum absorption of the RB 5 azo dye is found to be 598 nm. The degradation of the Reactive Black RB 5 azo dye was investigated to examine the photocatalytic properties of the newly synthesized nanocomposite. It was observed that the absorbance decreases in the presence of sunlight from 0.973 to 0.404 with an increase in the $C_{16}Co_4O_{16}Sn$ dosage from 0.30 to 0.70 mg mL$^{-1}$. It is noted that the value of the absorbance is also decreased from 0.973 to 0.079 by increasing the amount of hydrogen peroxide from 1 mL to 3 mL. The maximum degradation of Reactive Black 5 dye is observed for a 3 mL concentration of hydrogen peroxide and 0.70 mg mL$^{-1}$ of catalyst. The synthesized nanocomposite was also used to examine the efficiency of kerosene oil by investigating different parameters of the modified kerosene oil. From the addition of the nanocomposite to pure kerosene oil, the calorific values were also increased, which shows the effectiveness of the catalytic properties of the newly synthesized nanocomposite. It was also determined that the flash and fire point temperatures were significantly decreased by the addition of the $C_{16}Co_4O_{16}Sn$ nanoparticles. It is also observed that the $C_{16}Co_4O_{16}Sn$ nanoparticles have a positive effect on the pour point and cloud point temperatures of pure kerosene oil. The experimental results of photocatalytic and fuel additive applications indicate that the newly synthesized $C_{16}Co_4O_{16}Sn$ nanoparticles have an efficient surface area and photocatalytic properties.

In the present research, the degradation of Reactive Black 5 synthetic dye at 30 ppm concentration under sun irradiation in the presence of a newly synthesized graphene based cobalt tin oxide nanocomposite was investigated. These nanoparticles were synthesized by a simple hydrothermal approach using precursor chloride salt i.e., stannous chloride and cobalt chloride and then adsorbed on the surface of RGO by a solvothermal process by changing the condition. The newly synthesized product was subjected to various instrumentation to study the morphology and other properties. X-ray powder diffraction analysis (XRD) explained the structural composition and various parameters of the product, which were further verified by Vesta software. The surface morphology of the product was analyzed by scanning electron microscopy (SEM) and it was observed that the size of each cube was approximately 5-10 μm from every face of the cube. Transmission electron microscopy (TEM) showed that the nanoparticles were within the range of 100-250 nm. These synthesized nanocubes were used in one more application, which was the investigation of the fuel efficiency in the presence of different concentrations of newly synthesized nanocomposites as a catalyst. The efficiency of kerosene oil was investigated by studying different parameters: the flash point, fire point, specific gravity, cloud point, pour point, and calorific value at increasing dosages of catalyst (0, 30, 60, and 90 ppm). It was observed that the values of these parameters changed significantly by changing the concentration of the catalyst dosage. The effect of the nanoparticles on the degradation of the RB 5 azo dye showed the highest removal percentage at the largest value of catalyst dosage, which was 0.70 mg mL$^{-1}$ with the highest value of 3 mL of hydrogen peroxide.

The invention claimed is:

1. A method of reducing an organic contaminant concentration in a solution, the method comprising:
 mixing the solution with a nanocomposite and hydrogen peroxide to form a mixture; and
 irradiating the mixture to photo-catalytically degrade a portion of the organic contaminant;
 wherein the solution has an organic contaminant concentration of 5-200 ppm, and
 wherein the nanocomposite comprises tin cobalt oxide nanocubes and graphene oxide.

2. The method of claim 1, wherein the nanocomposite has a cobalt to tin molar ratio in a range of 2:1-4:1.

3. The method of claim 1, wherein the nanocubes have an average side length in a range of 400 nm-1.5 μm.

4. The method of claim 1, wherein the nanocomposite has a carbon to tin molar ratio in a range of 10:1-25:1.

5. The method of claim 1, wherein the nanocomposite has an empirical formula of $C_{16}Co_4O_{16}Sn$.

6. The method of claim 1, wherein the nanocomposite consists essentially of carbon, cobalt, oxygen, and tin.

7. The method of claim 1, wherein the nanocomposite has a band gap in a range of 2.92-3.02 eV.

8. The method of claim 1, wherein the irradiating involves exposing the mixture to sunlight for a time in a range of 120-200 min.

9. The method of claim 1, wherein a concentration of the nanocomposite in the mixture is in a range of 0.3-1.0 g/L.

10. The method of claim 1, wherein a concentration of the hydrogen peroxide in the mixture is in a range of 0.05-1 M.

11. The method of claim 1, wherein at least 75% of the organic contaminant is degraded, relative to an amount of organic contaminant before the irradiating.

12. The method of claim 1, wherein the organic contaminant has a UV-Vis absorption maximum in a range of 560-640 nm.

13. The method of claim 1, wherein the organic contaminant is a dye.

14. A method of enhancing the efficiency of a liquid fuel, comprising:
 mixing a nanocomposite with the liquid fuel to produce an enhanced liquid fuel having a calorific value that is greater than the calorific value of the liquid fuel,
 wherein the nanocomposite comprises tin cobalt oxide nanocubes and graphene oxide,
 wherein the nanocubes have a cobalt to tin molar ratio in a range of 2:1-4:1, and
 wherein the nanocomposite is present at a concentration in a range of 15-120 ppm.

15. The method of claim 14, wherein the nanocomposite has the empirical formula $C_{16}Co_4O_{16}Sn$.

16. The method of claim 14, wherein the liquid fuel is kerosene.

17. The method of claim 14, wherein a calorific value of the enhanced liquid fuel is between 20 and 40 times the calorific value of the liquid fuel.

18. The method of claim 14, wherein the liquid fuel and the enhanced liquid fuel have specific gravities having a percent difference of 0.7% or less.

19. The method of claim 14, wherein the enhanced liquid fuel has a specific gravity in a range of 0.7800-0.7900 g/cm$^3$.

20. The method of claim 14, wherein the enhanced liquid fuel has a flash point of 35° C. or lower.

* * * * *